(12) United States Patent
Reynolds

(10) Patent No.: US 9,418,626 B2
(45) Date of Patent: Aug. 16, 2016

(54) SENSING DURING NON-DISPLAY UPDATE TIMES

(71) Applicant: Synaptics Incorporated, San Jose, CA (US)

(72) Inventor: Joseph Kurth Reynolds, Alviso, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 14/788,267

(22) Filed: Jun. 30, 2015

(65) Prior Publication Data
US 2015/0302831 A1 Oct. 22, 2015

Related U.S. Application Data

(63) Continuation of application No. 13/034,696, filed on Feb. 24, 2011.

(60) Provisional application No. 61/308,864, filed on Feb. 26, 2010, provisional application No. 61/369,617, filed on Jul. 30, 2010.

(51) Int. Cl.
*G09G 5/18* (2006.01)
*G06F 3/041* (2006.01)
*G06F 3/044* (2006.01)

(52) U.S. Cl.
CPC ........ *G09G 5/18* (2013.01); *G06F 3/044* (2013.01); *G06F 3/0412* (2013.01); *G06F 3/0418* (2013.01)

(58) Field of Classification Search
CPC .............................. G06F 3/044; G06F 3/0418
See application file for complete search history.

(56) References Cited

U.S. PATENT DOCUMENTS

| 5,093,655 A | 3/1992 | Tanioka et al. |
| 5,392,058 A | 2/1995 | Tagawa |

(Continued)

FOREIGN PATENT DOCUMENTS

| CN | 1940842 | 4/2007 |
| CN | 101051256 | 10/2007 |

(Continued)

OTHER PUBLICATIONS

Office Action for U.S. Appl. No. 13/034,696, Mailed Sep. 20, 2013, 24 pages, Sep. 20, 2013.
Notice of Allowance for U.S. Appl. No. 12/726,322, Mailed Sep. 24, 2013, 19 pages.
Office Action for U.S. Appl. No. 12/772,012, Mailed Aug. 15, 2013, 13 pages.

(Continued)

*Primary Examiner* — Ilana Spar
*Assistant Examiner* — Mihir Rayan

(57) ABSTRACT

A method of capacitive sensing using an integrated capacitive sensor device and display device comprising a plurality of combination electrodes comprises driving a first of the plurality of combination electrodes for capacitive sensing during a first non-display update time period of a first frame; driving a second of the plurality of combination electrodes for capacitive sensing during a second non-display update time period of the first frame; and driving a third of the plurality of combination electrodes for capacitive sensing during a third non-display update time period of the first frame, the plurality of combination electrodes configured for both capacitive sensing and display updating. Driving the first second, and third combination electrodes for capacitive sensing comprises driving the first, second, and third combination electrodes with a signal that transitions at least twice during each respective non-display update time period of the display device.

19 Claims, 19 Drawing Sheets

(56) References Cited

U.S. PATENT DOCUMENTS

| | | | |
|---|---|---|---|
| 5,534,892 | A | 7/1996 | Tagawa |
| 5,896,120 | A | 4/1999 | Iguchi et al. |
| 6,219,113 | B1 | 4/2001 | Takahara |
| 6,239,788 | B1 | 5/2001 | Nohno et al. |
| 6,560,276 | B1 | 5/2003 | Long et al. |
| 7,031,886 | B1 | 4/2006 | Hargreaves |
| 7,193,601 | B2 | 3/2007 | Furuya |
| 7,557,834 | B2 | 7/2009 | Kaneko et al. |
| 7,633,566 | B2 | 12/2009 | Utsunomiya et al. |
| 7,792,220 | B2 | 9/2010 | Alderson et al. |
| 8,027,417 | B2 | 9/2011 | Jia et al. |
| 8,040,326 | B2 | 10/2011 | Hotelling et al. |
| 8,174,589 | B2 | 5/2012 | Ise |
| 8,576,161 | B2 | 11/2013 | Chang et al. |
| 8,643,624 | B2 * | 2/2014 | Day .................. G06F 3/0412 345/174 |
| 2004/0095336 | A1 | 5/2004 | Hong |
| 2004/0104881 | A1 * | 6/2004 | Furuya ................ G09G 3/3677 345/98 |
| 2004/0217945 | A1 | 11/2004 | Miyamoto et al. |
| 2004/0239338 | A1 | 12/2004 | Jonsson et al. |
| 2005/0135492 | A1 | 6/2005 | Jia et al. |
| 2006/0012575 | A1 | 1/2006 | Knapp et al. |
| 2006/0013507 | A1 | 1/2006 | Kaneko et al. |
| 2006/0114247 | A1 | 6/2006 | Brown |
| 2007/0074914 | A1 | 4/2007 | Geaghan et al. |
| 2007/0182723 | A1 | 8/2007 | Imai et al. |
| 2007/0262966 | A1 | 11/2007 | Nishimura et al. |
| 2008/0018581 | A1 | 1/2008 | Park et al. |
| 2008/0048989 | A1 | 2/2008 | Yoon et al. |
| 2008/0055267 | A1 | 3/2008 | Wu et al. |
| 2008/0062139 | A1 | 3/2008 | Hotelling et al. |
| 2008/0062140 | A1 | 3/2008 | Hotelling et al. |
| 2008/0062147 | A1 | 3/2008 | Hotelling et al. |
| 2008/0062148 | A1 | 3/2008 | Hotelling et al. |
| 2008/0144743 | A1 | 6/2008 | Alderson et al. |
| 2008/0150901 | A1 | 6/2008 | Lowles et al. |
| 2008/0158167 | A1 * | 7/2008 | Hotelling .............. G06F 1/3262 345/173 |
| 2008/0180407 | A1 | 7/2008 | Utsunomiya et al. |
| 2008/0309625 | A1 | 12/2008 | Krah et al. |
| 2008/0309627 | A1 * | 12/2008 | Hotelling .......... G02F 1/134363 345/173 |
| 2008/0309628 | A1 | 12/2008 | Krah et al. |
| 2009/0009194 | A1 | 1/2009 | Seguine |
| 2009/0079707 | A1 | 3/2009 | Kaehler et al. |
| 2009/0160461 | A1 | 6/2009 | Zangl et al. |
| 2009/0195511 | A1 | 8/2009 | Cites et al. |
| 2009/0207154 | A1 * | 8/2009 | Chino ........................ 345/175 |
| 2009/0256818 | A1 | 10/2009 | Noguchi et al. |
| 2010/0001973 | A1 * | 1/2010 | Hotelling ............ G02F 1/13338 345/174 |
| 2010/0019780 | A1 | 1/2010 | Bulea |
| 2010/0045635 | A1 * | 2/2010 | Soo ........................ G06F 3/046 345/178 |
| 2010/0053380 | A1 | 3/2010 | Ise |
| 2010/0060591 | A1 | 3/2010 | Yousefpor et al. |
| 2010/0066692 | A1 | 3/2010 | Noguchi et al. |
| 2010/0085324 | A1 | 4/2010 | Noguchi et al. |
| 2010/0110040 | A1 | 5/2010 | Kim et al. |
| 2010/0182273 | A1 | 7/2010 | Noguchi et al. |
| 2010/0193257 | A1 | 8/2010 | Hotelling et al. |
| 2010/0194695 | A1 | 8/2010 | Hotelling et al. |
| 2010/0194696 | A1 | 8/2010 | Chang et al. |
| 2010/0194697 | A1 | 8/2010 | Hotelling et al. |
| 2010/0194698 | A1 | 8/2010 | Hotelling et al. |
| 2010/0214262 | A1 | 8/2010 | Ishizaki et al. |
| 2010/0225612 | A1 | 9/2010 | Ishizaki et al. |
| 2010/0265210 | A1 | 10/2010 | Nakanishi et al. |
| 2010/0289765 | A1 | 11/2010 | Noguchi et al. |
| 2010/0295804 | A1 | 11/2010 | Takeuchi et al. |
| 2010/0295824 | A1 | 11/2010 | Noguchi et al. |
| 2010/0302202 | A1 | 12/2010 | Takeuchi et al. |
| 2010/0309162 | A1 | 12/2010 | Nakanishi et al. |
| 2010/0321305 | A1 * | 12/2010 | Chang .................. G06F 3/0412 345/173 |
| 2010/0328239 | A1 | 12/2010 | Harada et al. |
| 2010/0328255 | A1 | 12/2010 | Ishizaki et al. |
| 2010/0328256 | A1 | 12/2010 | Harada et al. |
| 2010/0328257 | A1 | 12/2010 | Noguchi et al. |
| 2010/0328259 | A1 | 12/2010 | Ishizaki et al. |
| 2010/0328274 | A1 | 12/2010 | Noguchi et al. |
| 2010/0328291 | A1 | 12/2010 | Ishizaki et al. |
| 2011/0042152 | A1 | 2/2011 | Wu |
| 2011/0050585 | A1 | 3/2011 | Hotelling et al. |
| 2011/0063993 | A1 * | 3/2011 | Wilson .................... G06F 3/044 370/254 |
| 2011/0084857 | A1 * | 4/2011 | Marino et al. .................... 341/5 |
| 2011/0084918 | A1 * | 4/2011 | Sung ...................... G06F 3/0412 345/173 |
| 2011/0102361 | A1 | 5/2011 | Philipp |
| 2011/0210939 | A1 | 9/2011 | Reynolds et al. |
| 2011/0210940 | A1 | 9/2011 | Reynolds |
| 2011/0210941 | A1 | 9/2011 | Reynolds et al. |
| 2011/0267305 | A1 | 11/2011 | Shahparnia et al. |

FOREIGN PATENT DOCUMENTS

| | | |
|---|---|---|
| CN | 101051256 A | 10/2007 |
| CN | 101305338 A | 11/2008 |
| CN | 100583707 C | 1/2010 |
| CN | 102053751 A | 5/2011 |
| EP | 1892605 | 2/2008 |
| EP | 1936479 | 6/2008 |
| EP | 2330493 A2 | 6/2011 |
| JP | 11305932 A2 | 11/1999 |
| JP | 2006-106853 | 4/2006 |
| JP | 2007-334606 | 12/2007 |
| JP | 2008090623 | 4/2008 |
| JP | 2009054141 A | 3/2009 |
| JP | 2009244958 A | 10/2009 |
| JP | 2009258182 A2 | 11/2009 |
| JP | 2009540374 A | 11/2009 |
| JP | 2010-072581 | 4/2010 |
| KR | 1020080012594 | 2/2008 |
| KR | 1020080012594 A | 2/2008 |
| KR | 1020100007717 | 1/2010 |
| TW | 200945147 | 11/2009 |
| WO | 01/27868 | 4/2001 |
| WO | 0127868 A1 | 4/2001 |
| WO | WO03019346 | 3/2003 |
| WO | 2004/046905 | 6/2004 |
| WO | 2006/054585 | 5/2006 |
| WO | 2007/003108 | 1/2007 |
| WO | 2007/012256 | 2/2007 |
| WO | 2007/102238 | 9/2007 |
| WO | 2008/050507 | 5/2008 |
| WO | 2010/009655 | 1/2010 |
| WO | 2010/137727 | 12/2010 |

OTHER PUBLICATIONS

Office Action for U.S. Appl. No. 13/034,696, Mailed May 31, 2013, 22 pages.
Office Action Search Report, CN Application No. 201180021590.0, 2 pages, Dec. 17, 2015.
Office Action, JP Application No. 2012-555162, 7 pages, Jan. 27, 2015.
Office Action, JP Application No. 2013-507988 , 6 pages, Mar. 3, 2015.
Office Action, U.S. Appl. No. 13/034,679 mailed Jun. 26, 2013, 25 pages.
Office Action, U.S. Appl. No. 13/034,687, mailed Jun. 24, 2014, 32 pages.
Chen, et al., "Partial Human Translation of Wipo Publication WO-2007/012256-A1", Jan. 2, 2007.
Office Action Search Report for CN Application No. 201180021254. 6, Mailed Nov. 4, 2015, 3 Pages.

* cited by examiner

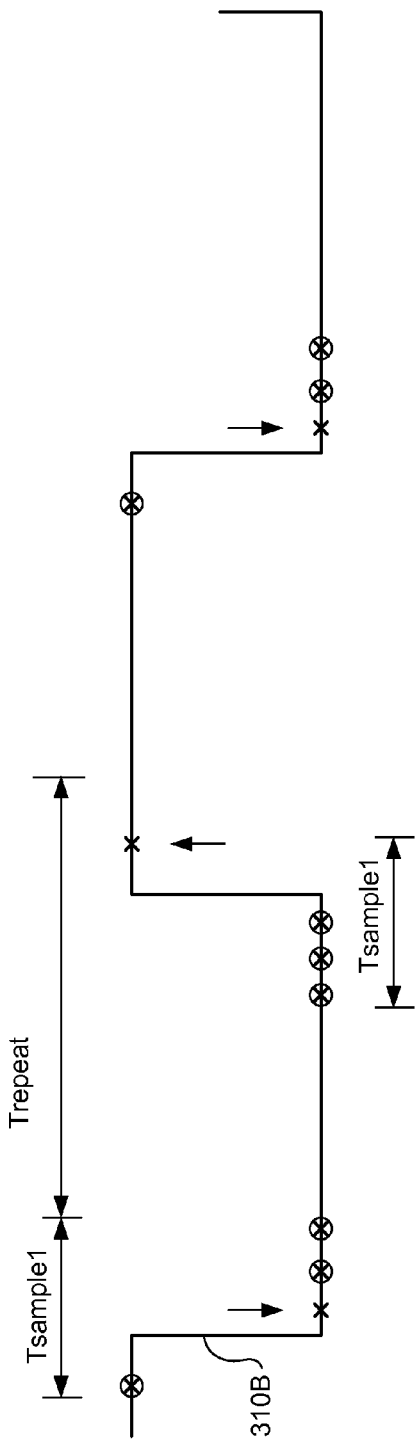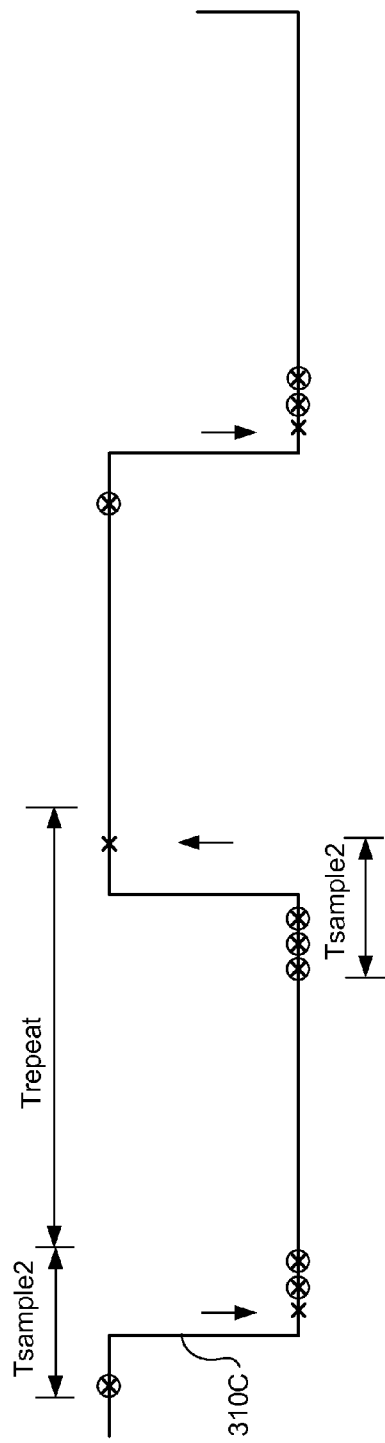

500

```
┌─────────────────────────────────────────────────┐
│ TRANSMIT A TRANSMITTER SIGNAL WITH A TRANSMITTER│
│   ELECTRODE OF A CAPACITIVE SENSOR DEVICE.      │
│                      510                        │
└─────────────────────────────────────────────────┘
                       ↓
┌─────────────────────────────────────────────────┐
│ RECEIVE A RESULTING SIGNAL WITH A RECEIVER      │
│ ELECTRODE OF THE CAPACITIVE SENSOR DEVICE, THE  │
│ RESULTING SIGNAL CORRESPONDING TO THE           │
│ TRANSMITTER SIGNAL.                             │
│                      520                        │
└─────────────────────────────────────────────────┘
                       ↓
┌─────────────────────────────────────────────────┐
│ ACQUIRE A FIRST DEMODULATED OUTPUT BY           │
│ DEMODULATING THE RESULTING SIGNAL IN A FIRST WAY.│
│                      530                        │
└─────────────────────────────────────────────────┘
                       ↓
┌─────────────────────────────────────────────────┐
│ ACQUIRE A SECOND DEMODULATED OUTPUT BY          │
│ DEMODULATING THE RESULTING SIGNAL IN A SECOND   │
│ WAY, WHEREIN IN THE SECOND WAY AND THE FIRST    │
│ WAY DIFFER.                                     │
│                      540                        │
└─────────────────────────────────────────────────┘
                       ↓
┌─────────────────────────────────────────────────┐
│ SHIFT FROM USING THE FIRST DEMODULATED OUTPUT   │
│ FOR DETERMINING POSITIONAL INFORMATION TO USING │
│ THE SECOND DEMODULATED OUTPUT FOR DETERMINING   │
│ POSITIONAL INFORMATION, WHEREIN THE SHIFTING IS │
│ BASED AT LEAST IN PART UPON AN AMOUNT OF        │
│ INTERFERENCE.                                   │
│                      550                        │
└─────────────────────────────────────────────────┘
```

TRANSMIT A FIRST TRANSMITTER SIGNAL HAVING A FIRST FREQUENCY WITH A COMBINATION ELECTRODE OF AN INTEGRATED CAPACITIVE SENSOR DEVICE AND DISPLAY DEVICE, WHEREIN THE COMBINATION ELECTRODE IS CONFIGURED FOR BOTH CAPACITIVE SENSING AND DISPLAY UPDATING.
810

SHIFT FROM TRANSMITTING THE FIRST TRANSMITTER SIGNAL WITH THE COMBINATION ELECTRODE TO TRANSMITTING A SECOND TRANSMITTER SIGNAL WITH THE COMBINATION ELECTRODE BY CHANGING A DURATION OF AT LEAST ONE NON-DISPLAY UPDATE TIME PERIOD OF THE DISPLAY DEVICE, WHEREIN THE SECOND TRANSMITTER SIGNAL HAS A SECOND FREQUENCY, AND WHEREIN THE SHIFT OCCURS BASED AT LEAST IN PART UPON AN AMOUNT OF INTERFERENCE.
820

USE THE FIRST TRANSMITTER SIGNAL TO UPDATE THE DISPLAY DEVICE.
830

RECEIVE A RESULTING SIGNAL WITH A RECEIVER ELECTRODE, THE RESULTING SIGNAL CORRESPONDING TO THE FIRST TRANSMITTER SIGNAL.
840

DETERMINE A FIRST MEASUREMENT OF A CHANGE IN A TRANSCAPACITIVE COUPLING BETWEEN THE COMBINATION ELECTRODE AND THE RECEIVER ELECTRODE BASED ON THE RESULTING SIGNAL.
850

DETERMINE POSITIONAL INFORMATION BASED ON THE FIRST MEASUREMENT.
860

TRANSMIT A TRANSMITTER SIGNAL WITH A COMBINATION ELECTRODE OF AN INTEGRATED CAPACITIVE SENSOR DEVICE AND DISPLAY DEVICE, THE COMBINATION ELECTRODE CONFIGURED FOR BOTH CAPACITIVE SENSING AND DISPLAY UPDATING, WHEREIN THE TRANSMITTER SIGNAL TRANSITIONS AT LEAST TWICE DURING A NON-DISPLAY UPDATE TIME PERIOD ASSOCIATED WITH ROW UPDATE OF THE DISPLAY DEVICE.
1110

UPDATE A DISPLAY OF THE DISPLAY DEVICE DURING AN UPDATE TIME PERIOD.
1120

RECEIVE A RESULTING SIGNAL WITH A RECEIVER ELECTRODE OF THE INTEGRATED CAPACITIVE SENSOR DEVICE AND DISPLAY DEVICE DURING THE NON-DISPLAY UPDATE TIME PERIOD, WHEREIN THE RESULTING SIGNAL CORRESPONDS TO THE TRANSMITTER SIGNAL.
1130

FIG. 11A

SENSING DURING NON-DISPLAY UPDATE TIMES

CROSS REFERENCE TO RELATED APPLICATIONS

This application is a continuation of and claims priority to and benefit of co-pending U.S. patent application Ser. No. 13/034,696 filed on Feb. 24, 2011 entitled "SENSING DURING NON-DISPLAY UPDATE TIME TO AVOID INTERFERENCE" by Joseph Kurth Reynolds et al., and assigned to the assignee of the present application, the disclosure of which is hereby incorporated herein by reference in its entirety.

Application Ser. No. 13/034,696 claims priority to and benefit of U.S. provisional patent application 61/308,864, filed Feb. 26, 2010 and assigned to the assignee of the present non-provisional application, which is herein incorporated by reference in its entirety.

Application Ser. No. 13/034,696 claims priority to and benefit of U.S. provisional patent application 61/369,617, filed Jul. 30, 2010 and assigned to the assignee of the present non-provisional application, which is herein incorporated by reference in its entirety.

This Application is related to U.S. patent application Ser. No. 13/034,679 by Joseph Kurth Reynolds et al., filed on Feb. 24, 2011, entitled "Varying Demodulation to Avoid Interference", and assigned to the assignee of the present non-provisional application. To the extent not repeated herein, the contents of this related patent application are incorporated herein by reference.

This Application is related to U.S. patent application Ser. No. 13/034,687 by Joseph Kurth Reynolds, filed on Feb. 24, 2011, entitled "Shifting Carrier Frequency to Avoid Interference", and assigned to the assignee of the present non-provisional application. To the extent not repeated herein, the contents of this related patent application are incorporated herein by reference.

BACKGROUND

Input devices including proximity sensor devices (also commonly called touchpads, touch screens, or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as opaque or transparent touch screens integrated in cellular phones).

SUMMARY

In a method of interference avoidance for a capacitive sensor device, a transmitter signal is transmitted with a transmitter electrode of the capacitive sensor device. A resulting signal is received with a receiver electrode of the capacitive sensor device. The resulting signal corresponds to the transmitter signal. A first demodulated output is acquired by demodulating the resulting signal in a first way. A second demodulated output is acquired by demodulating the resulting signal in a second way, where the second way and the first way differ. A shift is made from using the first demodulated output for determining positional information to using the second demodulated output for determining positional information. The shift is based at least in part upon an amount of interference.

In a method of avoiding interference in an integrated capacitive sensor device and display device, a first transmitter signal having a first frequency is transmitted with a combination electrode of the integrated capacitive sensor device and display device. The combination electrode is configured for both capacitive sensing and display updating. A shift is made from transmitting the first transmitter signal with the combination electrode to transmitting a second transmitter signal with the combination electrode. The shift is made by changing a duration of at least one non-display update time period of the display device. The second transmitter signal has a second frequency, and the shifting occurs based at least in part upon an amount of interference.

In a method of capacitive sensing using an integrated capacitive sensor device and display device, a transmitter signal is transmitted with a combination electrode of the integrated capacitive sensor device and display device. The combination electrode is configured for both capacitive sensing and display updating. The transmitter signal transitions at least twice during a non-display update time period associated with row update of the display device. A display of the display device is updated during an update time period. A resulting signal is received with a receiver electrode of the integrated capacitive sensor device and display device during the non-display update time period. The resulting signal corresponds to the transmitter signal.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments of the present invention and, together with the Description of Embodiments, serve to explain principles discussed below, where like designations denote like elements, and:

FIGS. 3B-3D illustrate example waveforms which each have a sensing demodulation frequency that is different than the frequency of the transmitted transmitter signal to improve interference susceptibility, according to various embodiments;

FIGS. 5A and 5B illustrate a flow diagram of an example method of interference avoidance for a capacitive sensor device, according to various embodiments;

FIG. 8 illustrates a flow diagram of an example method of avoiding interference in an integrated capacitive sensor device and display device, according to various embodiments;

FIGS. 11A-11C illustrate a flow diagram of an example method of capacitive sensing using an integrated capacitive sensor device and display device, according to various embodiments.

DESCRIPTION OF EMBODIMENTS

The following Description of Embodiments is provided by way of example and not of limitation. Furthermore, there is no intention to be bound by any expressed or implied theory presented in the preceding Background or Summary, or the following Description of Embodiments.

Overview of Discussion

Herein, various embodiments of the present invention provide input devices and methods that facilitate improved usability. In various embodiments described herein, the input device may be a capacitive sensor device; a capacitive sensor device used in conjunction with or proximate a display device; or an integrated capacitive sensor device and display device which share use of one or more components.

Discussion begins with a description of an example input device with which or upon which various embodiments described herein may be implemented. Following this, the discussion is split into three sections. Section 1 discusses varying demodulation to avoid interference, and describes some techniques for demodulating a resulting signal differently. A first example processing system and components thereof are described in Section 1. Operation of the first processing system and its components are further described in conjunction with description of an example method of interference avoidance for a capacitive sensor device. Section 2 discusses shifting carrier frequency to avoid interference, and describes shifting from a first transmitter signal have a first frequency to a second transmitter signal have a second frequency. A second example processing system and components thereof are described in Section 2. Operation of the second processing system and its components are further described in conjunction with description of an example method of avoiding interference in an integrated capacitive sensor and display device. Section 3 discusses sensing during non-display update time to avoid interference, and describes some non-display update time periods and sensing techniques. A third example processing system and components thereof are also described in Section 3. Operation of the third processing system and its components are further described in conjunction with description of an example method of sensing using an integrated capacitive sensor device and display device.

Example Input Device

Figure 1A:
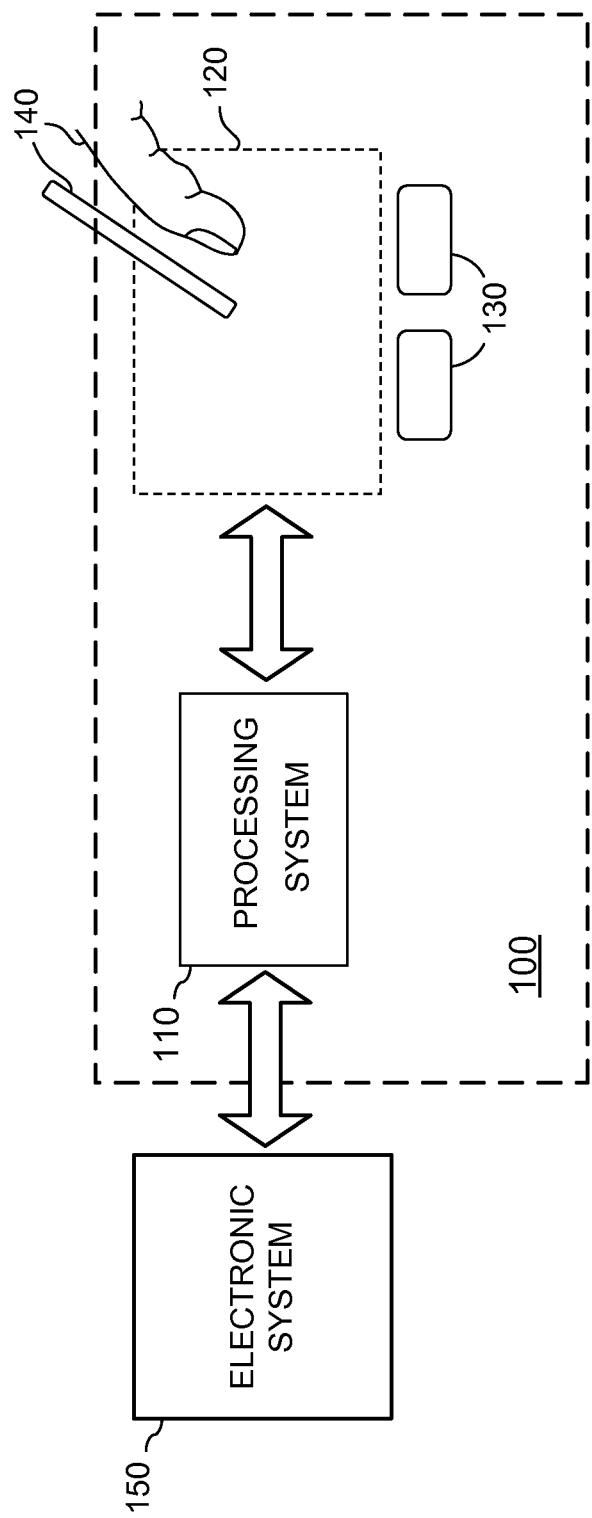
FIG. 1A is a block diagram of an example input device that is coupled with an example electronic system, in accordance with embodiments of the invention.

FIG. 1A is a block diagram of an example input device 100, in accordance with embodiments of the invention. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system 150 could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include, but are not limited to: Inter-Integrated Circuit (I²C), Serial Peripheral Interface (SPI), Personal System 2 (PS/2), Universal Serial Bus (USB), Bluetooth®, Radio Frequency (RF), and Infrared Data Association (IrDA).

In FIG. 1A, the input device 100 is shown as proximity sensor device (also often referred to as a "touchpad" or a "touch sensor device") configured to sense input provided by one or more input objects 140 in a sensing region 120. Example input objects include fingers and styli, as shown in FIG. 1A.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, a lens window for a display, etc. In various embodiments, an air gap may exist between a face sheet and the sensor electrodes. In some embodiments, the sensing region 120 has a rectangular shape when projected onto an input surface of the input device 100. In some embodiments, the sensor region may comprise multiple sub regions that may be used for determining two-dimensional positional information for at least one input object, determining one-dimensional positional information for at least one input object and zero-dimensional positional information for at least one input object. The configuration of sensing regions and responses may be dynamic and/or dependent on user input, external communication or based on processing system 110.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, surface acoustic wave, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiving sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1A, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc. In some embodiments, the electronically-readable instructions of processing system 110 may be updated by electronic system 150, where electronic system 150 may update the electronically-readable instructions of processing system 110 via wired and wireless communications.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one embodiment, processing system 110 comprises a module for controlled updating of the electronically-readable instructions of processing system 110.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system 150 (e.g., to a central processing system of the electronic system that is separate from the processing system 110, if such a separate central processing system exists). In some embodiments, some part of the electronic system 150 processes information received from the processing system 110 to act on user input, such as to facilitate a full range of actions, including mode changing actions and GUI actions. In one embodiment the processing system may be configured to operate in a low-power mode with a reduced measurement rate and/or a report rate. In various embodiments, the low-power mode may include, but is not limited to, reduced transmitter scan rate, reduced frame rate, reduced backlight power, simultaneously driving multiple transmitters with a similar transmitter signal, etc.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system 150. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1A shows buttons 130 near the sensing region 120 that can be used to facilitate selection of items using the input device 100. Other types of additional input components include sliders, balls, wheels, switches, optical proximity sensor, and the like. In some embodiment, the use of additional input components may also be facilitated by indicating frame function on a display or by rejecting accidental user input using positional information from the input device. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In one embodiment, the display may include dot inversion, line inversion, frame inversion, or other methods. In various embodiments, the display may comprise a DC Vcom signal or an AC Vcom signal. In further embodiments, the display may comprise patterned vertical alignment, in plane switching, plan to line switching or other wide viewing angle improvements. The input device 100 and the display screen may share physical elements. For example, some embodiments may utilize some of the same electrical components for displaying and sensing. As another example, the display screen may be operated in part or in total by the processing system 110. In various embodiments, a complete pixel update to the display device may be referred to as a display frame. A display frames may be updated progressively (e.g., updating each display pixel row on a one-by-one basis) or interlaced (e.g., during a first period a first half of the display is updated and during a second period a second half of the display is updated. In various embodiments, the portion of the display update time used for capacitive sensing may be limited by the settling time of the combination electrodes, by the signal to noise ratio or interference. In one embodiment, this time may be based on the settling time and any tolerance. The settling time can be modeled as an RC time constant. Reducing either variable of a combination electrode may reduce the settling time. Further, reducing the tolerance may also reduce the settling time. In various embodiments by disposing the electrodes on different layers, using thicker layers, wider or narrower electrodes or different connection methods (e.g., multiple connection or additional high conductivity jumpers) the RC time constant may be reduced.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Some embodiments utilize a construction of two-layer indium tin oxide (ITO) on polyethylene terephthalate (PET). The dimensions such as width and thickness of PET, ITO sensor, and other materials (which may include polarizing elements as part of an LCD) may be sized to improve signal to noise and to reduce interference. A sensor pattern in sensing region 120 may include, among other electrode configurations, substantially straight electrodes, patterned electrodes, and/or two-pronged (or more) receiver electrodes over thick, bar-shaped transmitter electrodes. In other embodiments, the transmitter electrodes may be patterned. The external traces may be routed to a PCB (printed circuit board) surrounding the sensor pattern. Other embodiments include single-layer ITO on glass with or without and additional ground or guard layer for shielding purposes. Conductors other than ITO, such as metal, can also be used. In various embodiments, the conductors may include silver nano-wires, organic conductors (e.g., PEDOT (Poly(3,4-ethylenedioxythiophene)) or carbon-nano-tubes). A face sheet or a "window" lens (without or with an air gap) may be placed over the sensor electrodes. In one embodiment, the receiver electrodes may be disposed on the lens of a display or on the color filter substrate (color filter glass) of a display.

Figure 1B:
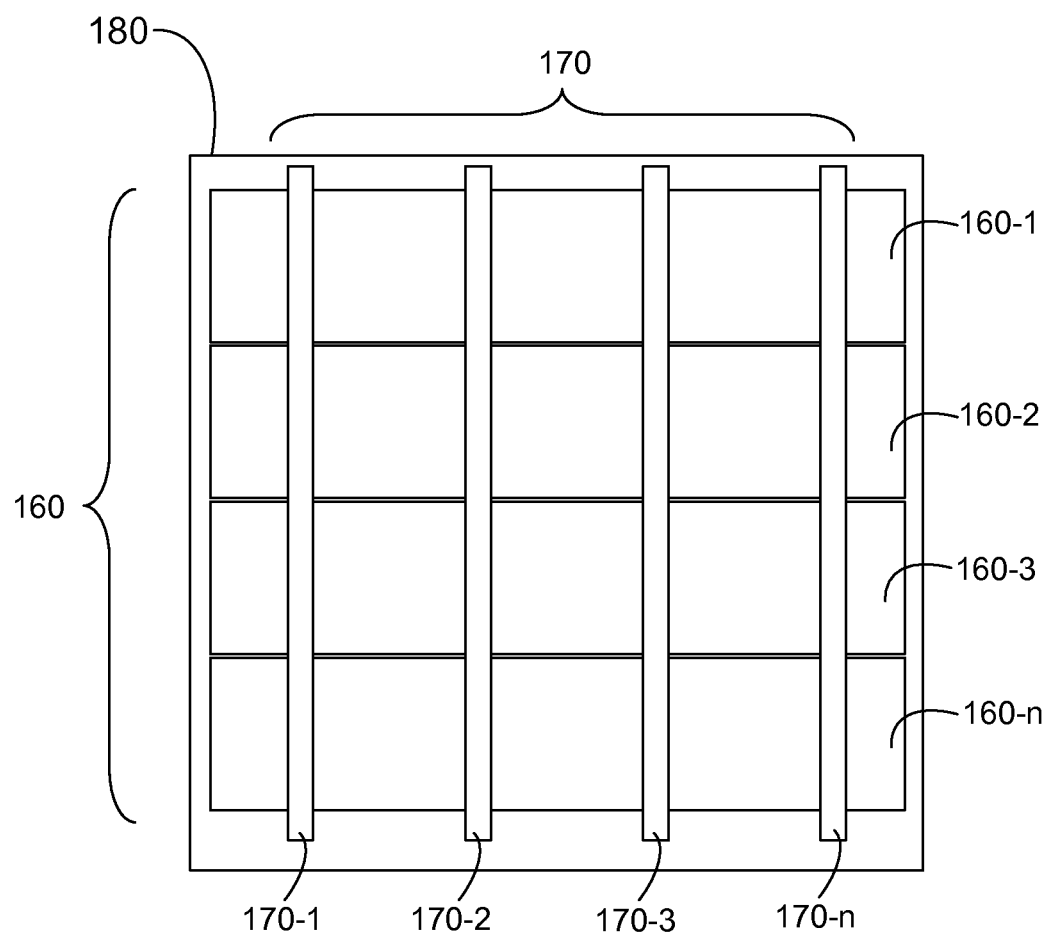
FIG. 1B shows a portion of an example sensor electrode pattern which may be utilized to generate all or part of the sensing region of an input device, according to an embodiment.

FIG. 1B shows a portion of an example sensor electrode pattern which may be disposed to generate all or part of the sensing region of an input device, according to an embodiment. For purposes of clarity of illustration and description, a simple rectangular pattern is illustrated. The sensing pattern is made up of a plurality of receiver electrodes 170 (170-1, 170-2, 170-3, . . . 170-$n$) and a plurality of transmitter electrodes 160 (160-1, 160-2, 160-3, . . . 160-$n$) which overlay one another and are disposed on a substrate 180. In other embodiments, the plurality of receiver electrodes 170 (170-1, 170-2, 170-3, . . . 170-$n$) and plurality of transmitter electrodes 160 (160-1, 160-2, 160-3, . . . 160-$n$) which overlay one another and are disposed on a multiple (or bonded) substrates. Touch sensing pixels are centered at locations where transmitter and receiver electrodes cross. In some embodiments, the receiver electrodes may be patterned to reduce visibility. In some embodiments, electrically floating electrodes may be patterned between receiver electrodes or portions of receiver electrodes to reduce visual performance. In some embodiments, the transmitter electrodes are combination electrodes and are patterned to provide display functionality. In various embodiments, touch sensing includes sensing input objects anywhere in sensing region 120 that may comprise no contact with any surfaces of input device 100, contact with an input surface (e.g., a touch surface) of input device 100, contact with an input surface of input device 100 coupled with some amount of applied force or pressure, and/or a combination thereof.

It is appreciated that some form of insulating material is typically disposed between transmitter electrodes 160 and receiver electrodes 170. In some embodiments, transmitter and receiver electrodes may be disposed on the opposite sides of substrate 180 or even on separate substrates which are stacked proximate one another. In some embodiments described herein, substrate assembly 180 is a substrate disposed in a display of a display device. For example, substrate assembly 180 may be a substrate used in the stack up of a liquid crystal display (LCD). In one embodiment, transmitter electrodes 160 and receiver electrodes 170 may be disposed on a similar layer of substrate assembly 180, where the transmitter electrode comprise a plurality of jumpers disposed on a second layer of the substrate assembly 180. In another embodiment, the transmitter electrodes 160 are disposed on a first layer of a substrate assembly 180 and the receiver electrodes 170 on a second layer of the substrate assembly 180 and jumpers are not required. In some embodiments, the transmitter electrodes 160 and receiver electrodes 170 may be disposed on a color filter substrate layer of a display. In another embodiment, receiver electrodes 170 may be disposed on a color filter substrate layer and the transmitter electrodes 160 may be disposed on a TFT (Thin Film Transistor) substrate layer of a display. In another embodiment, the receiver electrodes may be disposed on a protective layer, polarizer layer, lens glass or any other layer of a display device. In yet further embodiments, the receiver electrodes may be disposed on any layer above the transmitter electrodes.

Processing system 110 may detect changes in capacitive coupling between transmitter electrodes and receiver electrodes when an input object such as a human digit or a stylus is brought near. When the sensor comprises multiple transmitter electrodes (e.g., transmitter electrodes 160) or multiple receiver electrodes (e.g., receiver electrodes 170), multiple capacitive couplings are formed in a spatially distributed fashion. A set of measurements of such multiple capacitive couplings is often referred to as a capacitive "frame", or a capacitive "image". Such a capacitive "image" represents the magnitudes of the capacitive couplings during a particular period of time. Successive capacitive "images" represent the magnitudes or changes of the capacitive couplings during successive periods of time. In one embodiment, exciting transmitter electrodes in sequence may be described as scanning the capacitive sensor device. Such successive images can be used to track the motions of objects in time as they move throughout a sensing region. The rate at which successive images are captured is known as the capacitive sensor frame rate or report rate. In various embodiments, the capacitive frame rate may be different than the display frame rate. The set of measurements may comprise independently measuring the change in coupling of multiple "pixels" in a capacitive "image" associated with different groups of combination electrodes and/or different groups of receiver electrodes. In one embodiment, a baseline capacitive "image" is used to determine the change in capacitive coupling. Multiple capacitive baseline "images" may be used. The selection of the baseline image may be related to the relative phase of the display pixel rows relative the transmitting group of combination electrodes. Multiple baselines may be stored in various formats, including compressed and uncompressed formats. Compressed formats may include differences between baselines, or scaled, filtered and encoded versions of baselines. In one embodiment, more than one capacitive "image" may be collected from a single display frame. In various embodiments, the transmitter electrodes and combination electrodes may be driven with a substantially independent coding scheme such that a capacitive image can be determined from the independently driven transmitter groups.

In some display device embodiments, transmitter electrodes 160 are shared between a capacitive sensor device and a display device. In one embodiment of an integrated capacitive sensor device and display device, transmitter electrodes 160 act as transmitters for the capacitive sensor device and also as common electrodes (drivers) for display update of a display in a display device. In such embodiments of an integrated capacitive sensor device and display device, each transmitter electrode 160 (e.g., 160-1) can be referred to as a "combination electrode". In various embodiments, each common electrode is a segment or multiple segments of a segmented Vcom electrode. In some embodiments, the segments of a segmented Vcom electrode may be referred to as the spatially related display pixel rows or display rows of the display. In one embodiment, a fraction of the display area may be capacitively measured. In another embodiment, this occurs during a non-display update time of the display. In yet another embodiment, the entire display area can be measured or scanned during a single contiguous non-display update time of sufficient length. In various embodiments, the entire display may be measured during a single display frame. In other embodiments, the capacitive sensor may have faster report rates associated with updating only a fraction of the display area.

Figure 6:
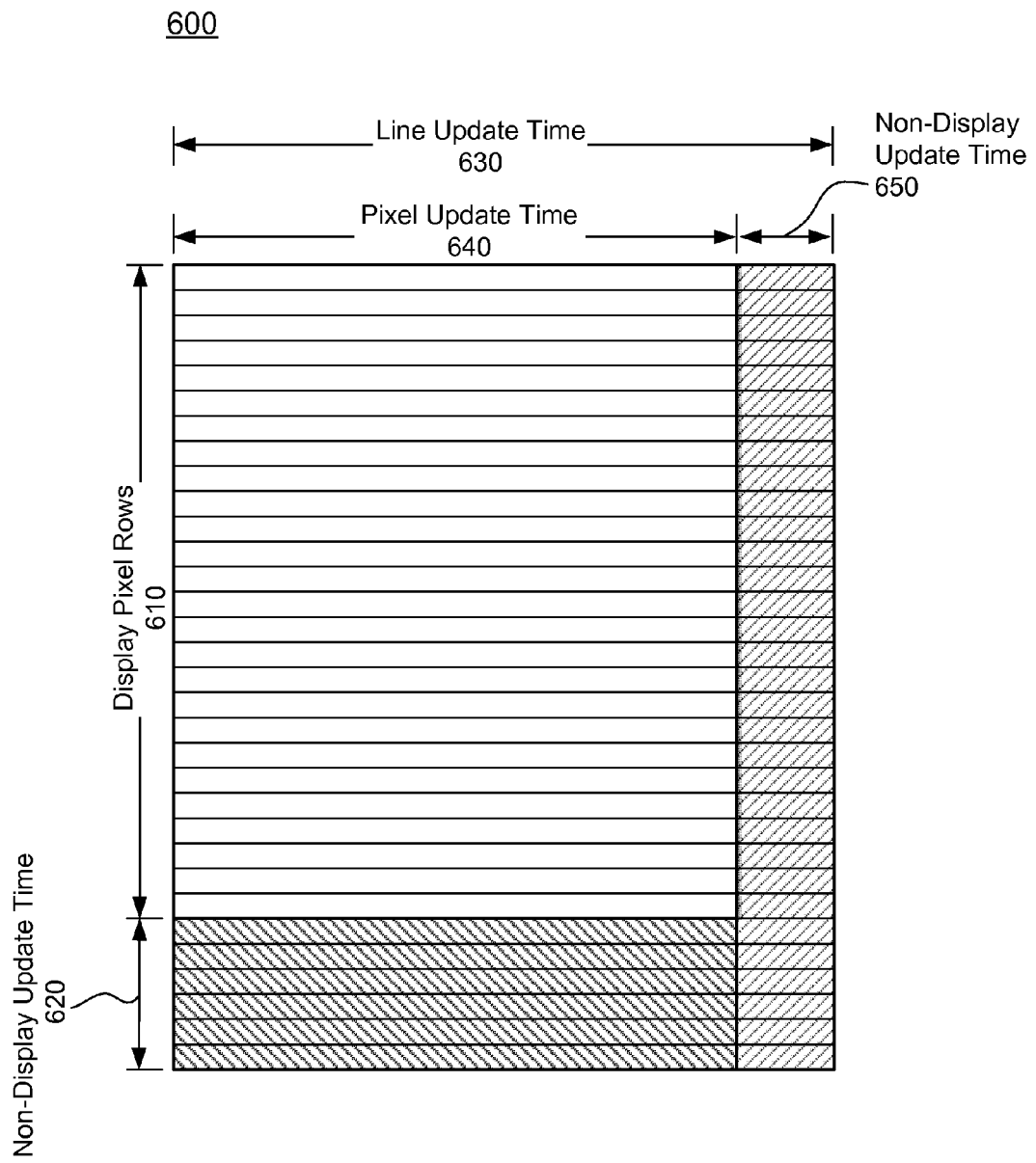
FIG. 6 illustrates a display device comprising a display with a plurality of display rows, according to an embodiment.

In many embodiments where combination electrodes 160 are utilized, one or more other components may also be integrated and shared between the capacitive sensing functions and the display functions. For example, processing system 110 may also be shared within an integrated capacitive sensor device and display device to coordinate and/or control some or all aspects of the capacitive sensing functions and the display functions. Though not illustrated, in one embodiment, other display pixel row electrodes can be layered in between or on top of transmitter electrodes 160 and receiver electrodes 170. Display device 600 of FIG. 6, shows one example of display pixel rows. In various embodiments, a display is updated by selecting a row of pixels to be updated and driving a voltage (or controlling a current) on the selected pixels through individually controlled source drivers to a common electrode associated to that row covering an array of pixels (or sub pixels). In one embodiment, the common electrode associated with multiple display pixel rows may be combined into a single combination electrode where substantially the same voltage for that combination electrode is applied to each display pixel row by processing system 110 for both display update and capacitive sensing.

Figure 1C:
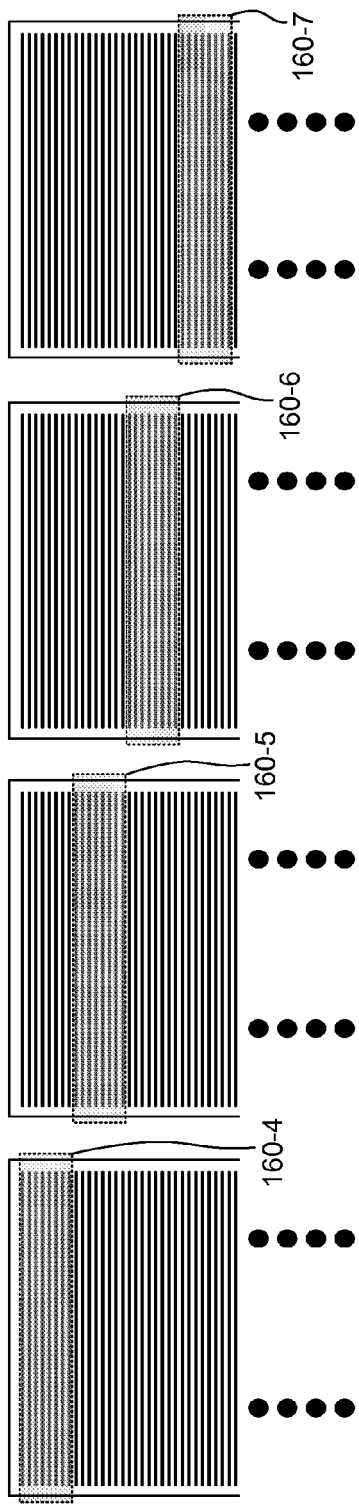
FIGS. 1C and 1D illustrate different examples of combination electrodes, according to various embodiments.

Turning now to FIG. 1C, FIG. 1C shows different phases groups (or sets) of non-overlapping combination electrodes 160-4-160-7. As can be seen in FIG. 1C, groups of combination electrodes 160-4-160-7 comprise different segments of a segmented Vcom electrode (or display pixel rows).

Figure 1D:
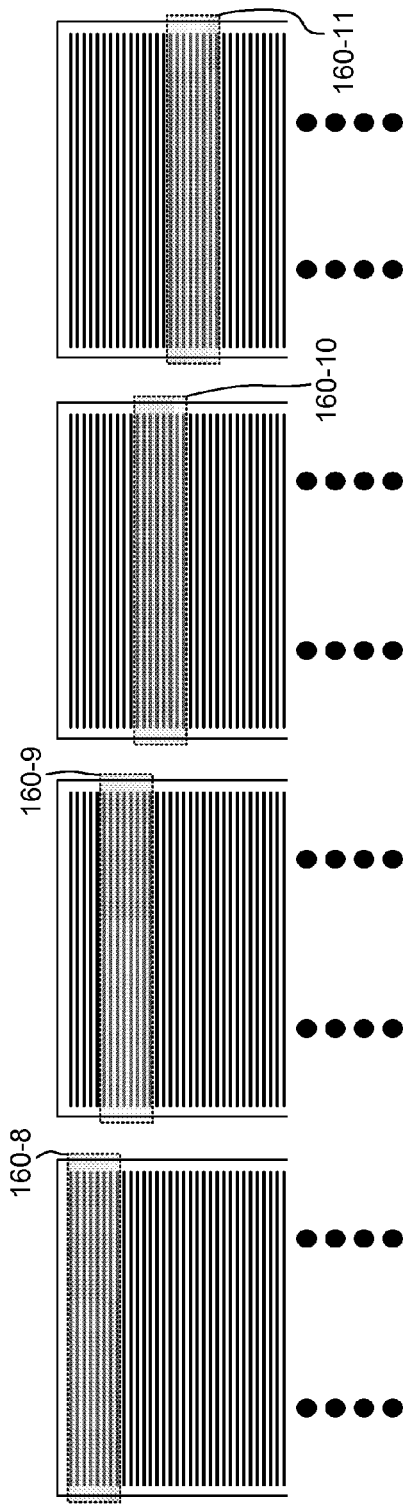

FIG. 1D shows different phases overlapping groups of combination electrodes 160-8-160-11. As can be seen in FIG. 1D, each group of combination electrodes shares at least one segment of a segmented Vcom electrode (or display pixel rows) with another group of combination electrodes. While 160-4 through 160-11 are referred to groups of combination electrodes, in other embodiments, they may be referred to as combination electrodes or groups of segments of a segmented Vcom. In various embodiments, each group of combination electrodes may driven at different times or at least two of the combination electrodes may be driven at the same time in order to scan the frame or a portion thereof. Further, the common electrodes may be disposed on the TFT glass in some displays (e.g., In Plan Switching (IPS) or Plan to Line Switching (PLS)) or on the bottom of the color filter glass of some displays (e.g., Patterned Vertical Alignment (PVA) or Multi-domain Vertical Alignment (MVA)).

In some embodiments, processing system 110 may be configured to transmit with more than one group of combination electrodes at different times (e.g., transmitting with one group of combination electrodes while a second group of combination electrodes are driven with a stationary voltage) during a non-display update time associated with updating a frame of a display (e.g., vertical blanking time).

Figure 1E:
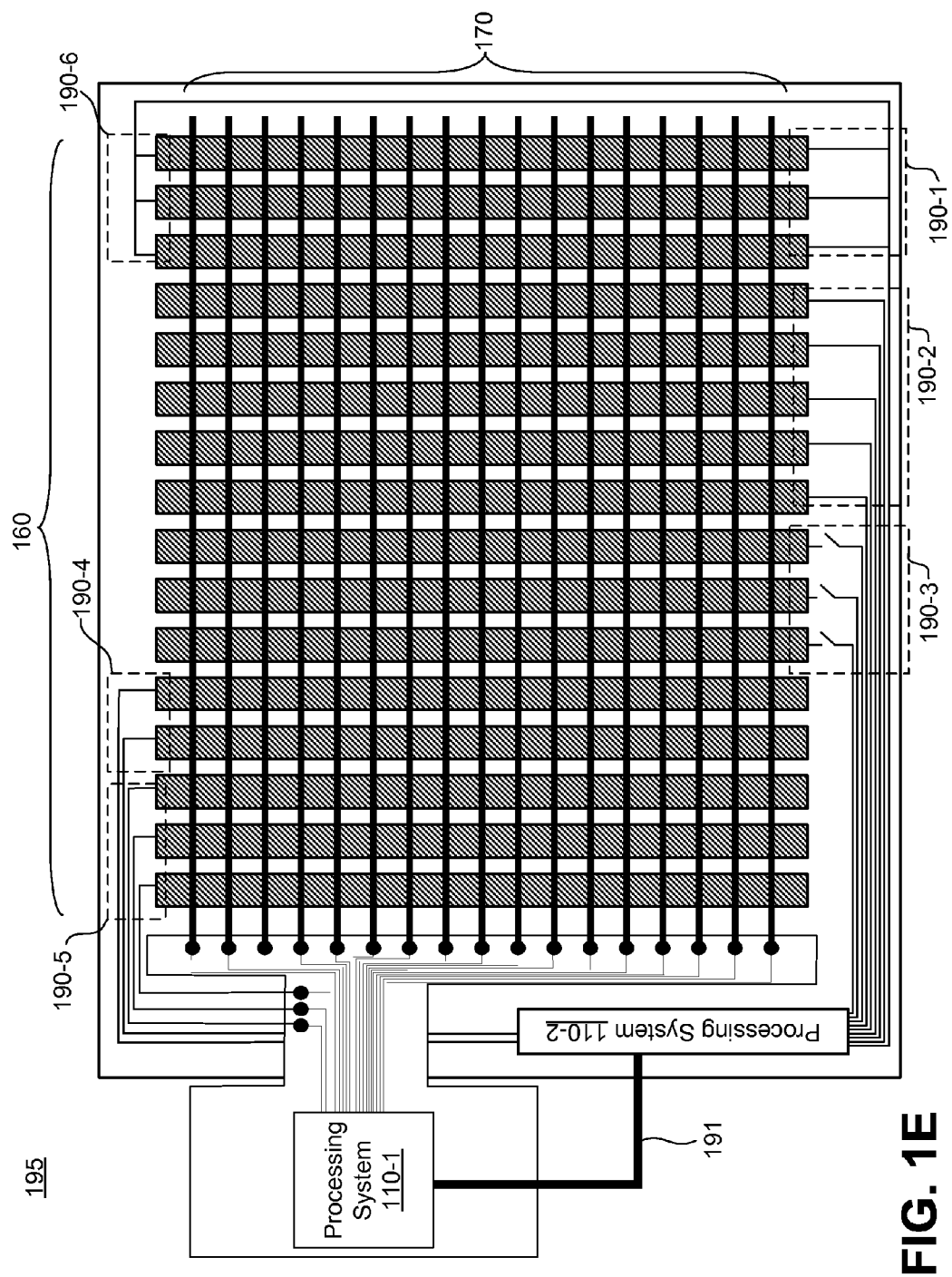
FIG. 1E shows an example of an input device according to various embodiments.

Turning now to FIG. 1E, FIG. 1E shows input device 195 comprising combination electrodes 161, receiver electrodes 170, processing system 110-1, processing system 110-2 and synchronization mechanism 191. Processing system 110-1 is coupled with receiver electrodes 160 and configured to receive resulting signals with receiver electrodes 161. In other embodiments processing system 110-1 is coupled with portion of or all of combination electrodes 161. In one further embodiment, input device 195 comprises transmitter electrodes and processing system 110-1 is coupled with the transmitter electrodes. Processing system 110-2 is coupled with combination electrodes 161. In one embodiment processing system 110-2 comprises display control circuitry for controlling the display of images. The display control circuitry is configured to apply one or more pixel voltage(s) to the display pixel electrodes through pixel source drivers (not shown). The display control circuitry may be also configured to apply one or more common drive voltage(s) to a common electrode. In one embodiment, the common drive voltage may or may not invert in synchronization with a drive cycle of the image display control (e.g., line inversion). In one embodiment, the combination electrodes may also be combination source drivers and capacitive sensor transmitters. In some embodiments, receiver electrodes may also share functionality with source driver electrodes. In one embodiment, processing system 110 comprises processing system 110-1 and processing system 110-2. In another embodiment, processing system 110-1 and processing system 110-2 may be implemented as integrated circuitry and modules of a single processing system.

Processing system 110-1 may be configured to control capacitive sensing and processing system 110-2 may be configured to control display updating. Processing system 110-1 may be coupled with processing system 110-2 via synchronization mechanism 191. Processing system 110-1 and processing system 110-2 may communicate with each other via synchronization mechanism 191. In one embodiment, processing system 110-2 may change the set of combination electrodes modulated to scan the sensing area in response to a synchronization signal. In one embodiment, processing system 110-1 may provide a signal synchronized with sampling the receivers to processing system 110-2 via synchronization mechanism 191. In another embodiment, processing system 110-2 may shift the transmitter signal (display reference voltage) to another transmitter signal compatible for driving the combination electrodes. In one embodiment, the display reference voltage may be provided to processing system 110-1 via synchronization mechanism and processing system 110-1 may use the reference voltage as the transmitter signal to be driven on the combination electrodes. In other embodiment, the synchronization mechanism 191 may share reference signals between processing system 110-1 and processing system 110-2. Synchronization signals may be shared between processing system 110-1 and processing system 110-2 to generate display compatible timing for the combination electrodes. In one embodiment, synchronization signals that may indicate pixel row timing and vertical frame timing may be shared and used for synchronization. In other embodiments, synchronization signals can also be used for other purposes within either processing system 110-1 or 110-2, such as, to directly drive different transmitter electrodes or receive with different receiver electrodes or to initialize input elements (e.g., buttons, scroll strips, etc.). In some embodiments, where processing system 110 comprises processing system 110-1 and processing system 110-2, the synchronization mechanism may be comprised by processing system 110 and generate display compatible timing for the combination electrodes. In various embodiments, the Vcom of the display is a display reference common voltage. In such embodiments, the reference voltage may be shared between processing system 110-1 and processing system 110-2 to provide display compatible synchronization voltages for the combination electrodes. In one embodiment, display compatible synchronization voltages comprises transmitter signals provided for capacitive sensing that do not interfere with display operation by a significant amount. In one embodiment, the displayed image does not comprise significant visible display defects. In another embodiment, the display compatible synchronization voltages comprise pixel update voltages that during the pixel update time do not interfere with capacitive sensing. In some embodiment, this comprises not causing significant report position errors for the capacitive sensor system.

In various embodiment, to avoid interference between display updates and capacitive sensing processing system 110 may suspend generation and driving of voltage transitions (e.g., edges) during the display update time. In another embodiment, processing system 110 may gate off the receiver circuitry of processing system 110 or suspend demodulation during "noisy" display update times. In other embodiments, to avoid interference between display updates and capacitive sensing processing system 110-1 and/or processing system 110-2 by suspend generation and driving of voltage transitions (e.g., edges) during the display update time. The display update time may be communicated to processing system 110-1 from processing system 110-2 via synchronization mechanism 191. In yet another embodiment, processing system 110-2 may signal processing system 110-1 to gate off the receiver circuitry of processing system 110-1 or suspend demodulation during "noisy" display update times via the synchronization mechanism 191.

Synchronization between separate display driving electronics (e.g., processing system 110-2) and capacitive sensing electronics (e.g., processing system 110-1) may be achieved by communicating between systems with synchronization mechanism 191 (e.g., an electrode carrying electronic pulses). In some embodiments, a triggering system may allow for synchronization where processing system 110-1 and processing system 110-2 have separate clock domains. The triggering system may have standard modes that are comparable to those that are available in an oscilloscope (e.g., delay time, active time, trigger hold off time etc.) or may use more generic playback techniques. In other embodiments, vector tables, LUTs (look up tables), and the like may be used in generating the trigger events and timing. In other embodiments, timing recovery signals (e.g., delay locked loops, phase locked loops, or others) can be used for synchronization may also be used. In yet other embodiment, processing system 110-1 may also communicate synchronization signals for generating transitions on (e.g., modulating) combination electrodes, gating or selecting which electrodes are modulated (e.g., selecting sets of combination electrodes). The synchronization signals may trigger events, or for space savings may drive more complex signals (e.g., shift register clocking for TFT glass). In some embodiments, a ground reference voltage will be communicated between the processing systems 110-1 and 110-2. In other embodiments, other voltages (e.g., a common display voltage like Vcom, Vcom+, Vcom−, etc) relative to the ground may also be communicated. Such a communicated reference may allow either processing system to drive combination electrodes and reduce any detrimental effects of capacitive sensing on display performance, or of display updates on capacitive sensing performance.

Coupling 190-1 shows that multiple combination electrodes may be coupled together and then coupled with processing system 110-2. In such a configuration, multiple combination electrodes may be driven simultaneously with similar transmitter signals. Coupling 190-2 shows that individual combination electrodes may be individually coupled with processing system 110-2. Coupling 190-3 shows that the coupling between individual combination electrodes and processing system 110-2 comprises switches and when a switch is open the corresponding combination electrodes are not driven and when a switch is closed the corresponding combination electrodes may be driven. In some embodiments, the switches may couple to various display voltages and their associated generating electronics. Coupling 190-4 shows that either end of combination electrodes may be coupled with processing system 110-2. In another embodiment, combination electrodes may be coupled at both ends with processing system 110-2 as shown by coupling 190-6 and 190-1. In another embodiment, combination electrodes may be coupled at both ends with processing system 110-1. Coupling 190-5 shows that combination electrodes may be coupled (e.g., driven by) with processing system 110-1. In further embodiments, combination electrodes may be coupled with both processing system 110-1 and processing system 110-2.

Section 1

Varying Demodulation to Avoid Interference

Figure 2:
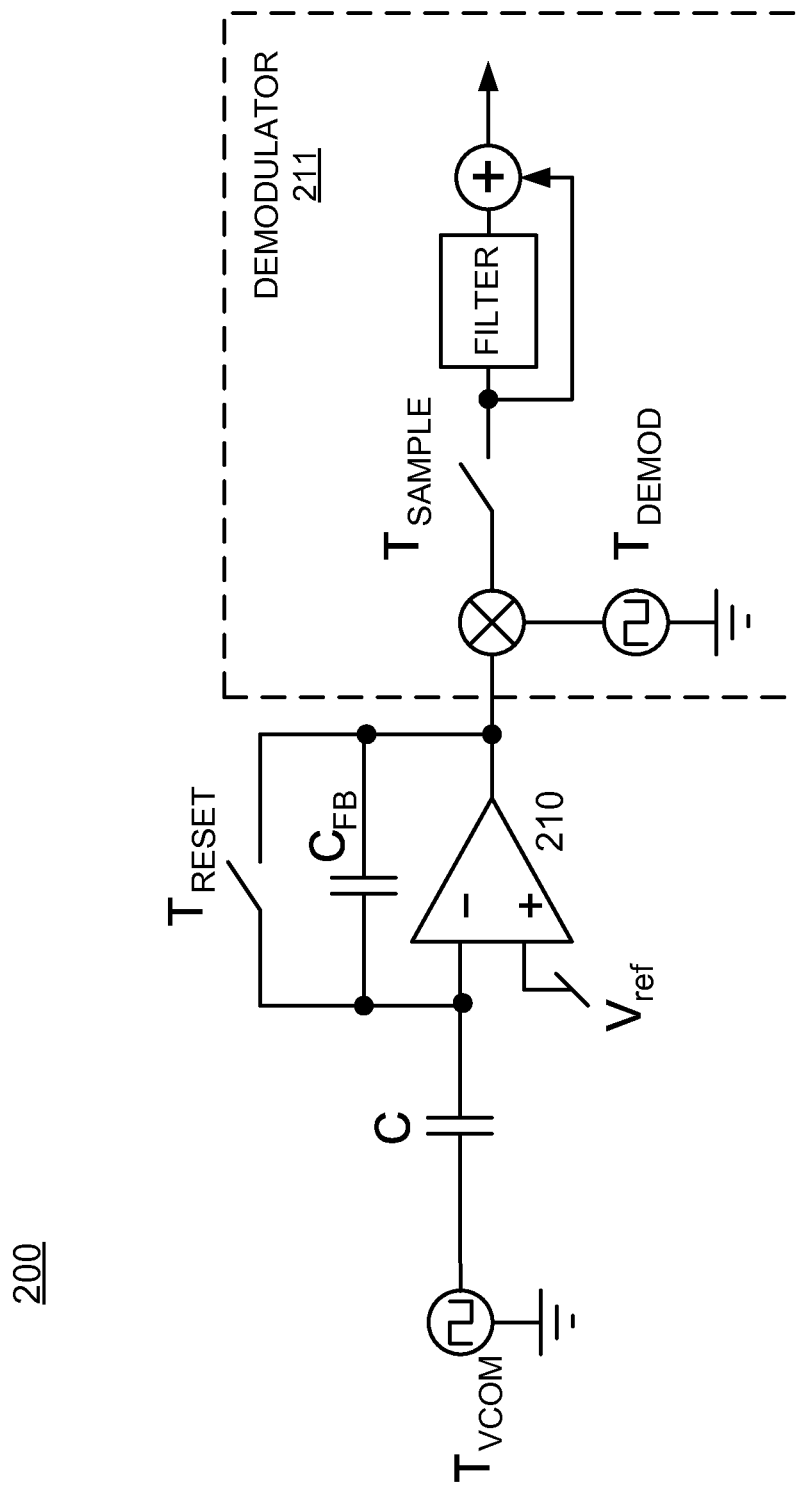
FIG. 2 shows an example of a capacitive measuring system configured to demodulate samples of a received resulting signal to improve the interference susceptibility of a capacitive sensor, according to an embodiment.

FIG. 2 shows an embodiment of a capacitive measuring system 200 configured to demodulate and filter samples of a received resulting signal to improve the interference susceptibility of a capacitive sensor. Throughout the following description, demodulate may refer to both demodulating and filtering. Even though one example capacitive measuring system is shown, other known (e.g., discrete time and continuous time) capacitive measuring systems demodulators and filters may also be used. In one embodiment, charge is accumulated during transitions of the transmitter signal (e.g., as the transmitter signal is changed from High to Low, Low to High, or other similar voltages) where current is transferred through the sensed capacitance C and accumulated into the charge accumulating capacitor $C_{FB}$ which is coupled between the inverting input and the output of integrating amplifier 210. A reference voltage Vref is coupled with the non-inverting input of integrating amplifier 210. The voltage output on $C_{FB}$ changes in response to the transferred charge. This voltage output on $C_{FB}$ is integrated by amplifier 210. After some "integration" time, $T_{int}$, an amount of charge is accumulated and a sample is taken of the voltage output and demodulated. The integration time may be variable, but unless the time is substantially long compared to any other sensor time constants, the accumulated charge may depend on $T_{int}$, which is undesirable. In one embodiment, integration and reset times may also be delayed for transmitter transitions where the sensor delays the charge transfer.

The voltage output of the accumulating capacitor may be reset for a "reset" time $T_{reset}$, which can be variable, following integration. In one embodiment, resetting is accomplished by removing accumulated charge from $C_{FB}$ by closing switch $T_{reset}$. This causes the output voltage to return to its "zero" state. Here, "zero" state is $V_{ref}$, the equilibrium output value when no signal is being integrated. On a subsequent voltage transition of opposite polarity, charge can be accumulated to develop another voltage which is sampled on the output of $C_{FB}$. Thus, in many embodiments, $T_{SAMPLE}=T_{DEMOD}/2$, or less, although this is not required. In other embodiments, continuous time demodulation and filtering may also be used, or single transition polarity may be used per transmitter period.

A larger number of demodulations, of the same or varying weights, may include over sampling, harmonic canceling, correlated double sampling or DC sensitive single polarity constant weighting. The two output voltage samples can be filtered in demodulator 211 by combining them at the demodulation frequency (or other variable timing) to obtain a measure of the capacitance. Other sensing methods may also be used without changing the nature of the described embodiments. For example other waveform shapes (e.g., trapezoidal), capacitive current transfer measurements (e.g., current multiplication), or demodulation methods (e.g., heterodyne detection) may be used in addition to those described herein. Also, other demodulation and resetting schemes are possible. In one embodiment, the reset step may not be present (e.g., it may be of zero length or continuous). As described below, it can be advantageous to allow the timing of the demodulation (e.g., $T_{DEMOD}$ and demodulation frequency) to be different than the timing of the transmitter signal (e.g., $T_{SIGNAL}$ and transmitter frequency) in order to facilitate interference avoidance. It is also advantageous to allow transmitter frequency to be different than the row update rate (or fractional row update for a single color of a display device) of a display device in order to facilitate interference avoidance. In one embodiment, the transmitter frequency is a reciprocal of the period between transitions and/or demodulated samples.

Figure 3A:
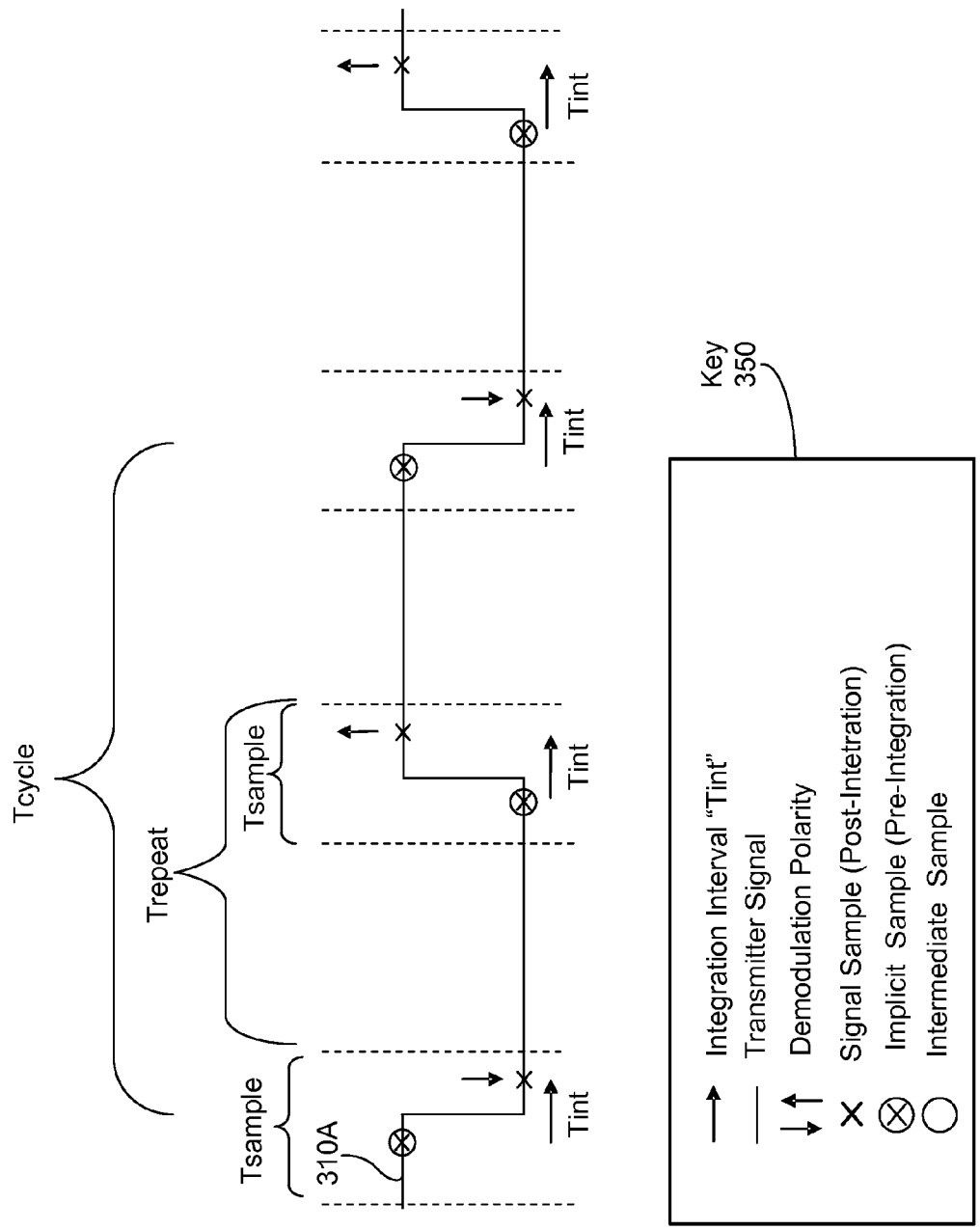
FIG. 3A illustrates a waveform of a capacitive sensor using a demodulation frequency that is the same as the frequency of the transmitted transmitter signal, according to an embodiment.

FIG. 3A illustrates a waveform 310A of a capacitive sensor using a demodulation frequency that is the same as the transmitted transmitter signal frequency. Each transition results in the update of a single display pixel row. In various embodiments, it is possible to transmit with multiple segmented Vcom electrode segments (e.g., sets of combination electrodes) during each transition. A block (groups or sets) of transmitter electrodes can, therefore, be comprised of one or more Vcom electrode segment(s) corresponding to multiple display pixel rows. These display pixel rows need not be contiguous. In one embodiment, where a combination electrode is utilized, the frequency of the transmitter signal for capacitive sensing and updating the display device are the same, and thus the interference susceptibility spectrum (that is, the interference susceptibility versus frequency) maybe fixed. In one embodiment, one or more transitions per display row may occur. The transitions may occur between row updates or between pixel or sub-pixel updates on a display row. In one embodiment, the transitions occur during the time the source drivers are multiplexed to multiple pixels or sub-pixels of a row. In another embodiment, the transitions may occur during a non-display update time after the display row selection is updated when the display source drivers are substantially de-coupled.

An example of timing of the touch sensor demodulation operation relative to the Vcom waveform 310A is illustrated in FIG. 3A. As indicated by key 350 (which also applies to FIGS. 3B, 3C, and 3D), the demodulator samples are marked by X's, X's within a circle, or empty circles; the signal 310 is denoted by the line of the square wave; horizontal arrows denote the length of an integration interval Tint; and vertical arrows denote demodulation polarity. In one embodiment, the filtering of the demodulated samples may be uniformly weighted. In one embodiment, intermediate samples may be ignored (e.g., filtered weighted with zero amplitude).

In FIGS. 3A-3D, X's without a circle indicate demodulation samples which occur after an integration period following a voltage transition. These demodulation samples contain new information and are referred to as "signal samples". The X's within a circle, on the other hand, occur without integration of a voltage transition. These demodulation samples are called "implicit samples" and may not contain any new signal information. Implicit samples may occur after a reset period but before the next voltage transition as shown in FIG. 3A. These implicit samples may or may not be independently filtered. In one embodiment, the implicit samples may be differentially filtered based on the difference between two signal samples and the distance between implicit samples. The implicit samples can be used to implement, for instance, double-correlated sampling. However, implicit samples may include interference information and are therefore important for filtering and affecting the interference susceptibility spectrum. The label, "$T_{SAMPLE}$" is utilized to demarcate a time period during which a set of samples may be obtained and filtered (e.g., summed, low passed filtered, etc.). The label, "$T_{CYCLE}$" is utilized to demarcate the period of the transmitter signal frequency.

The demodulation signal samples may be generated by integrating the coupled charge transfer caused by the voltage transition. In one embodiment, the demodulation signal samples may be generated by integrating between the implicit samples and the end of the signal integration. In order not to disturb the display or have the display disturb the capacitive sensing, the voltage transition (or transitions when two or more are used) may be timed to occur during a non-display update period associated with updating a display row. In one embodiment, sampling during the pixel update period is also avoided because interference from the display, such as that caused by multiplexed Red-Green-Blue (RGB) image data, can be injected into the receiver electrode during this time. In one embodiment, the location of the modulated combination electrodes may be correlated with the pixel line selected for update. In one embodiment, the beginning of the integration time is delayed from the transmitter transition to accommodate propagation delays. In one embodiment, the propagation delays are due to a display device switching time.

As shown in FIG. 3A, each row of the touch sensor may include one or multiple voltage transitions which occur while the at least one display line is updated. In one embodiment, the voltage transitions occur during a non-display update period. In another embodiment, the voltage transitions occur during a non-display update period and before the next display pixel row is updated. According to the embodiment of FIG. 3A, one transition would occur as one display row is updated before a new receiver electrode (e.g., receiver electrode 160-1) sampled. However, as multiple display rows are updated while a single receiver electrode is sampling, there will be multiple transitions filtered to comprise a demodulator output. In one embodiment, multiple combination electrodes (or sets or groups) may be driven with the same change in voltage during the non-display update time and driven to the same different voltage (e.g., a common voltage such as Vcom) during the display update time. In other embodiments, as described in conjunction with FIG. 9, a waveform may have multiple transitions that are timed to take place during a non-display update time associated with updating of a display pixel row (e.g., during the horizontal blanking period that occurs after a row is updated). In another embodiment, the multiple transitions are timed to take place during the non-vertical blanking time of the display between display frames. After the at least one display pixel row or frame is updated, a receiver electrode is sampled and demodulated before the next display line is updated. In various embodiments, multiple independent blocks of combination electrodes associated with spatially separated display rows can be modulated at different times between display row updates or display frame updates to scan the sensing area. The modulators may be demodulated and filtered substantially simultaneously by multiple receiver sensor electrodes 170 to compose a scanned capacitive "image" or spatial array of capacitive measurements to track multiple input objects independently.

FIG. 3B illustrates an example waveform having a sensing demodulation frequency that is different than the transmitter signal frequency to improve interference susceptibility. In one embodiment, to improve the interference susceptibility, a demodulation frequency that is different than the transmitter signal frequency is used. In one embodiment, this is enabled by including additional implicit samples in the demodulation. The time indicated by $T_{repeat}$ in FIGS. 3A, 3B and 3C is the sampling time of FIG. 3A and also the time between the sets of repeated samples of FIGS. 3B and 3C.

In FIG. 3B the demodulation frequency is changed by increasing the number of samples occurring during the sample timing (e.g., from two samples for $T_{SAMPLE}$ to four samples for $T_{SAMPLE1}$). Note that it is also possible to decrease the number of samples by not sampling during every transmitter signal transition. Also the number of samples per $T_{SAMPLE1}$ can be changed from one cycle to the next. The phase of subsequent cycles can also be modulated from one cycle ($T_{CYCLE}$) to the next. In one embodiment, the weighting of the samples may be changed in subsequent samples to avoid interference by differently demodulating the signal.

FIG. 3C illustrates another example waveform having a demodulation frequency that is different than the frequency of the transmitted transmitter signal. The sample time between demodulated samples of FIG. 3C (as shown by samples taken in $T_{sample2}$) is shorter than that of the FIG. 3B (as shown by samples taken during $T_{sampLe1}$); therefore, the demodulation frequency of FIG. 3C is higher than that of FIG. 3B, even though the repeat time ($T_{REPEAT}$) is the same.

By varying the demodulation frequency it is possible to cancel different harmonics within the interference spectrum. The method by which multiple demodulation cycles can occur during one Vcom transition (e.g., one horizontal display row) period is explained below. Further, the integration ($T_{int}$ in FIG. 3A), reset time and sampling rate can be adjusted to modulate in phase, amplitude and frequency, thus causing the interference susceptibility spectrum to be changed. For example, the demodulation sign can be changed and the relative phase of the transmitter signal, $T_{RESET}$ and $T_{int}$ can be changed. Also, the modulations of frequency or phase in the demodulation may be used to spread the interference susceptibility spectrum, allowing for increased interference tolerance. In one embodiment, the weighting of the samples can be changed (i.e., increased, decreased or changed in sign) to increase interference tolerance. The results of the demodulations may also be filtered using, for example but not limited to Infinite Impulse Response (IIR) filters and Finite Impulse Response (FIR) filters, continuous time filters and band pass filters. In other embodiments, a second demodulator may also be used after filtering. In some embodiments, the interference susceptibility of an input device can be altered by demodulating a received resulting signal with more than one of the above described methods.

In one embodiment, interference avoidance can be achieved by varying the sensor demodulation frequency and by sampling the received signal more than once (even for transmitter signals having only one transition) for each half-cycle of the transmitter signal, which allows many more types of demodulations and frequencies to be used. Consider an example where a pair of signal samples may have a demodulation frequency of 250 kHz (2 μs separation for each demodulation polarity), but voltage transitions may only occur at 50 kHz (each edge of the 25 kHz transmitter signal frequency). This provides one positive and one negative signal sample for four demodulation samples (there will be two signal samples and two implicit samples) each signal sample pair spaced apart by 20 μs in the 40 μs of the full transmitter modulation cycle. In some embodiments, the sum of samples containing the transitions signals are filtered the same the response to the capacitive signal will remain the same, independent of the weighting of other samples.

Figure 3D:
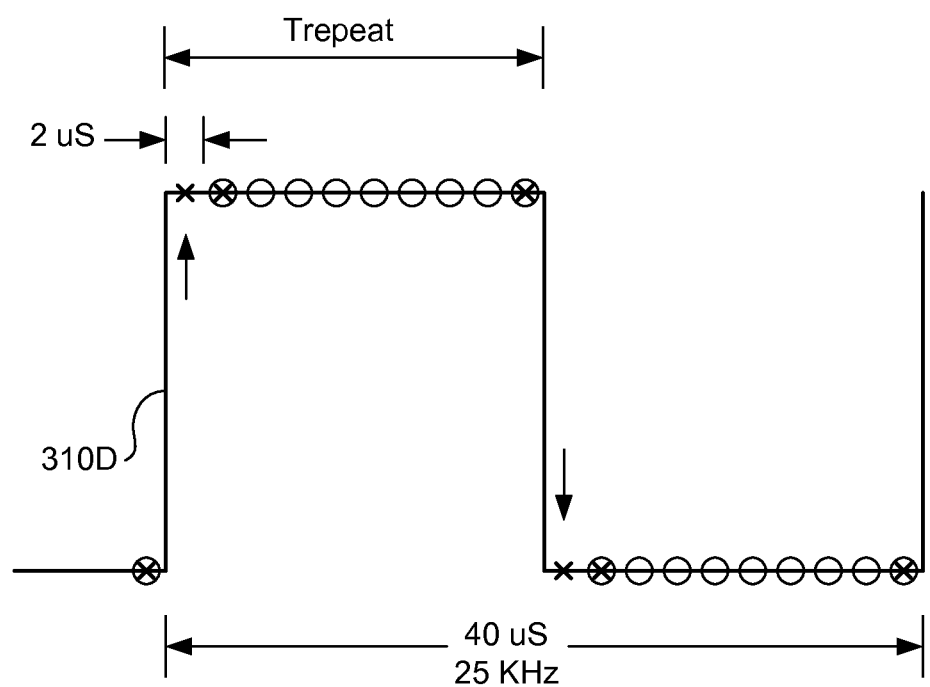

In some embodiments, as illustrated in FIG. 3D, there may be zero signal (intermediate samples) that are taken between positive and negative demodulated signal samples. In the embodiment which is illustrated by FIG. 3D, there are seven intermediate samples between positive and negative demodulated signal samples. Intermediate samples can be fractional cycles of the demodulator frequency which may or may not be used during processing. Adding in these intermediate signals alters the interference susceptibility of the input device, but not necessarily the signal response. For example, in one embodiment, adding in the intermediate samples create 50 kHz susceptibility sidebands off of a 250 kHz resulting signal (with an envelope set by the integration time) that go to 0 at DC due to the short integration time. The interference susceptibility spectra for the single pair demodulation scheme and the double demodulation scheme (or higher order sin c, shaped or FIR demodulation loop) with the same resulting signal are substantially orthogonal (e.g., non-substantially overlapping peaks) include: a first spectrum with peaks at (1+2N)×25 kHz; and a second spectrum with peaks at N×50 kHz. The ability to select between these two demodulation schemes therefore enables effective interference avoidance via demodulation frequency shifting even when the frequency of the transmitted transmitter signal is substantially fixed. In various embodiments, when the demodulating frequency is different than the transmitter signal frequency, the demodulated result is not at a substantially stationary voltage and it can be selectively filtered or demodulated and filtered again. Further, in various embodiments, the demodulation frequency changes relative to the transmitter signal frequency. In other embodiments, the filter can be changed to filter for the frequency difference between the demodulation frequency and transmitter signal frequency.

In further embodiments, multiple higher rate samples may be taken around each transition of the resulting signal, allowing for modulation of both the phase and frequency of the received resulting signal. For example, in one embodiment, some number of samples, labeled as intermediate samples in FIG. 3D, may be included in the signal calculation to change the frequency susceptibility. The samples may be taken in an analog form (e.g., sampled onto a capacitor) or in a digital form (e.g., sampled with an analog-to-digital converter (ADC)).

It is appreciated that changing demodulation schemes can be accomplished when it is noted that the interference is above some predetermined level when using one scheme. When this happens an alternative demodulation scheme can then be employed. In some embodiments, one or more demodulation schemes may be deployed and the one with the least interference may be selected and used. This will be described in more detail within the following paragraphs.

First Example Processing System

Figure 4:
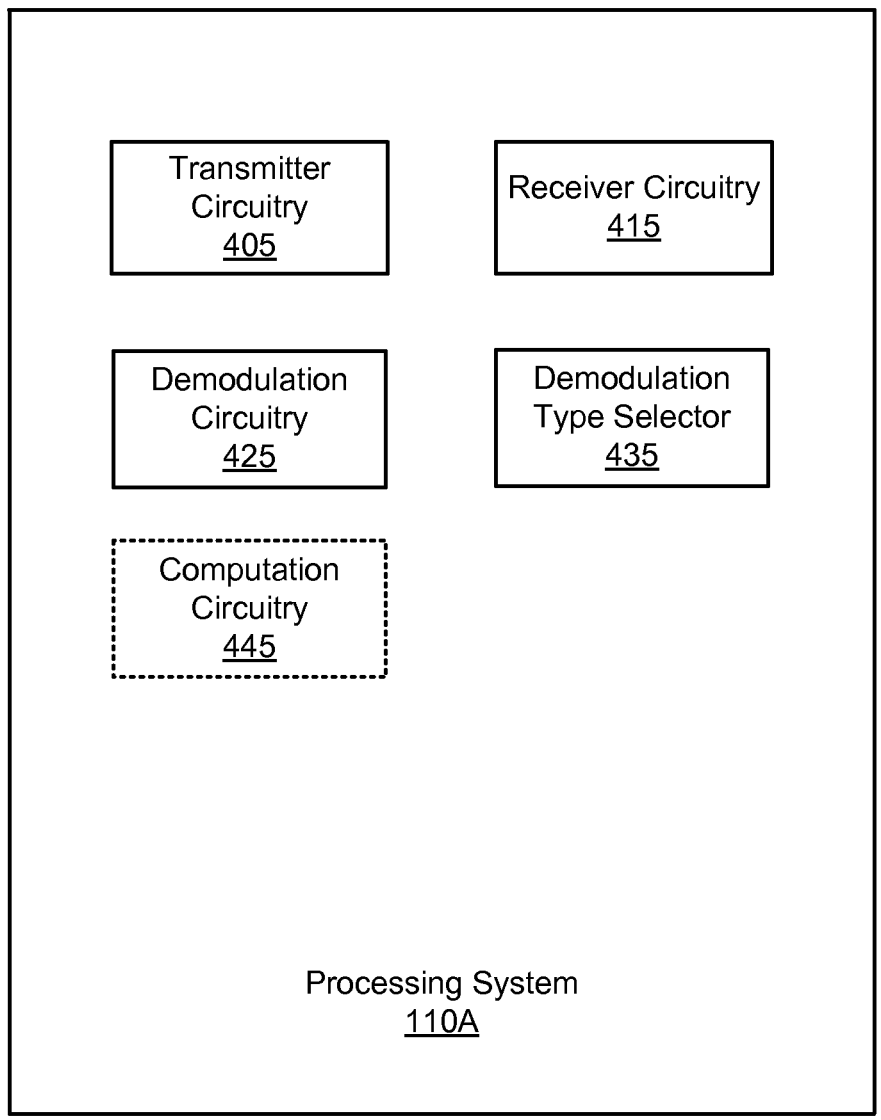
FIG. 4 illustrates a first example processing system which may be utilized with an input device, according to various embodiments.

FIG. 4 illustrates a first example processing system 110A which may be utilized with an input device (e.g., input device 100), according to various embodiments. Processing system 110A may be implemented with one or more ASICs, one or more ICs, one or more controllers, or some combination thereof. In one embodiment, processing system 110A is communicatively coupled with a plurality of transmitter electrodes (or combination electrodes) and a plurality of receiver electrodes that implement a sensing region 120 of an input device 100. In one embodiment of input device 100, processing system 110A includes transmitter circuitry 405, receiver circuitry 415, demodulation circuitry 425, and demodulation type selector 435. Some embodiments additionally include computation circuitry 445.

Figure 9:
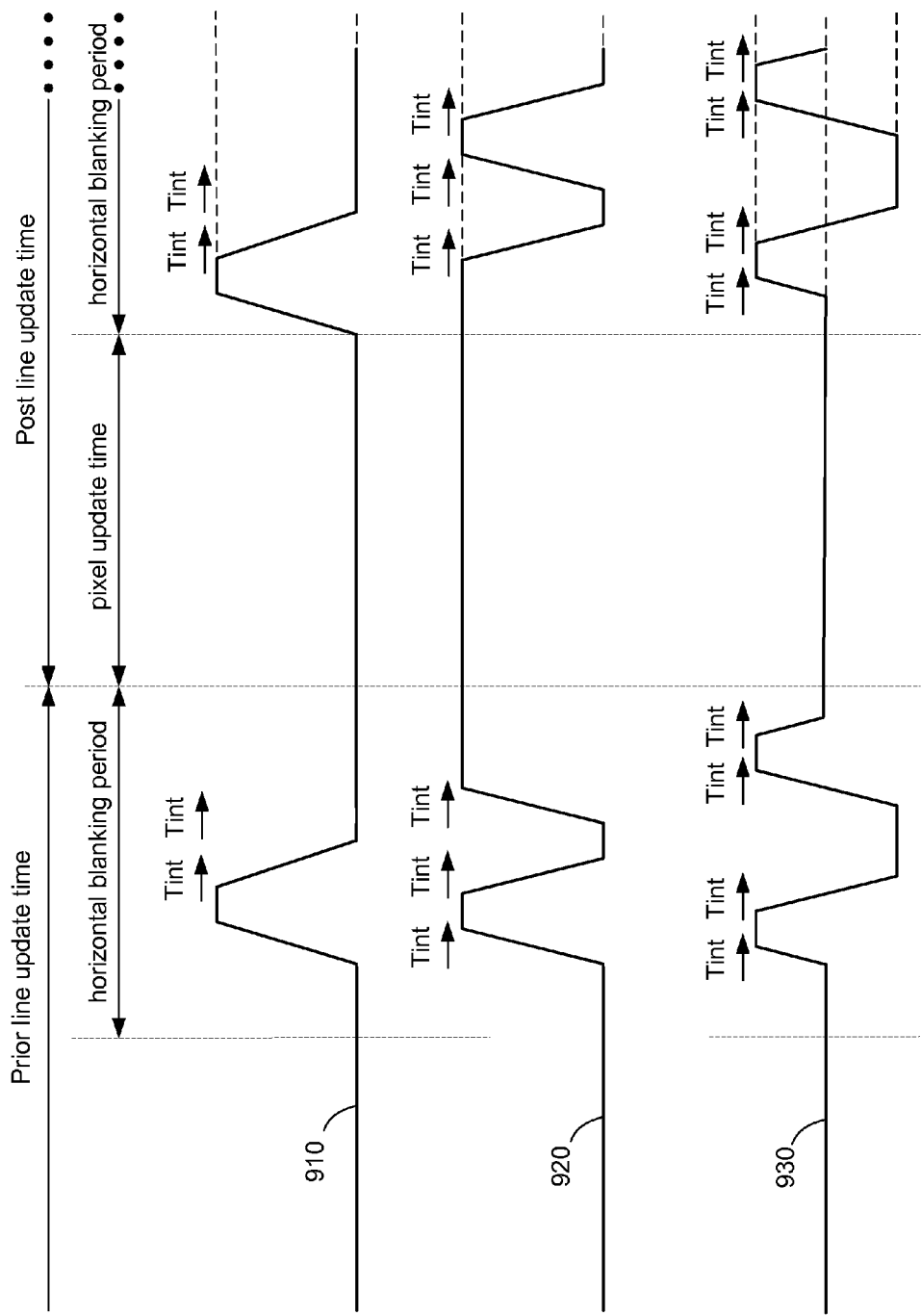
FIG. 9 illustrates three transmitter signals with transitions during non-display update time, according to various embodiments.

Transmitter circuitry 405 operates to transmit transmitter signals with one or more transmitter electrodes (or combination electrodes) that are disposed in a sensing region. In a given time interval, transmitter circuitry 405 may transmit a transmitter signal (waveform) with one or more of a plurality of transmitter electrodes. Transmitter circuitry 405 may also be utilized to couple one or more transmitter electrodes of a plurality of transmitter electrodes to ground or to a constant voltage such as a reference voltage (e.g., Vcom or some other reference voltage) when not transmitting with such transmitter electrodes. Transmitter circuitry may scan through different transmitter (combination) electrodes at different time to scan through the sensing region. The transmitter signal may be a square wave, trapezoidal wave, or some other waveform. In various embodiments, waveforms 910, 920, and 930 of FIG. 9 illustrate some examples of waveforms which may be driven by transmitter circuitry 405 and transmitted with transmitter electrodes/combination electrodes. It should be noted, and will be further explained below, that waveforms 910, 920 and 930 illustrate that multiple transitions (e.g., two or more) can be made in the waveform of the transmitted transmitter signal and timed such that the transitions occur during a non-display update time period (e.g., horizontal blanking period or vertical blanking period). During the non-display update time, the transitions will not have any effect upon display updating, but will provide extra transitions to sample for touch sensing. In another embodiment, the transitions may be synchronous with the display update period (e.g., at substantially the same time as a pixel update in a row or display frame update).

Receiver circuitry 415 operates to receive resulting signals, via receiver electrodes, which correspond to one or more transmitted transmitter signals. The received resulting signals correspond to and may include some version of the transmitter signal(s) transmitted via the transmitter electrodes (e.g., the coupled charge). These transmitted transmitter signals however, may be altered, changed or filtered in the resulting signal due to stray capacitance, interference (noise), and/or circuit imperfections among other factors, and thus may differ slightly or greatly from their transmitted versions. Resulting signals may be received on one or a plurality of receiver electrodes during a time interval. In one embodiment, resulting signals may be received while no transmitter signal is transmitted with the transmitter electrode. In such embodiment, the resulting signals can be used to determine an amount of ambient/environmental interference. FIGS. 3A-3D illustrate sampling of resulting signals which are received by receiver circuitry 415 (e.g., after current is integrated to measure the coupled charge). In one embodiment, filtering the resulting signals at different phases of the transmitter scan may be used for the measurement of capacitive changes at different portions of the capacitive sensing area.

Demodulation circuitry 425 operates to demodulate the received resulting signals. In various embodiments, demodulation circuitry comprises a demodulator and a filter. Demodulation circuitry 425 may be configured to demodulate resulting signals in a plurality of different ways. In one embodiment the resulting signal is affected by user input. For example, the received resulting signal may be affected in amplitude, phase or frequency by a user input. This allows demodulation circuitry 425 to acquire a first demodulated output by demodulating a resulting signal in a first way, a second demodulated output by demodulating the resulting signal in a second and different way from the first way that the resulting signal was demodulated, and so forth. In various embodiment, the first and second ways of demodulation differ because: demodulation circuitry 425 weights samples differently in the first way as compared to the second way; demodulation circuitry 425 takes samples that are in a different phase in the first way as compared to the second way; demodulation circuitry 425 utilizes different numbers of samples in the first way as compared to the second way; and/or there are differing time spans between the samples used by demodulation circuitry 425 in the first way as compared to the second way. Examples of different ways to demodulate the resulting signal are illustrated in FIGS. 3A-3D. Further, in other embodiments the demodulation circuitry 425 may further configured to demodulate the first resulting signal in a third way, the third way different than the first and second ways. In further embodiments, the demodulation circuitry 425 may further be configured to demodulate the first resulting signal in any number of ways, where each way is different. In a continuous time demodulator the demodulation may vary in amplitude, frequency or phase. Further, in various embodiments, the post filtering of the demodulated signal may vary in bandwidth, cut-off frequency(s) or phase. In various embodiments, the post filtering may include a second demodulation before sampling.

Demodulation type selector 435 operates to shift processing system 110A from using the first demodulated output for determining positional information to using the second demodulated output for determining positional information. A variety of factors may be used to determine when to make such a shift. In one embodiment, demodulation type selector 435 bases such a shift at least in part upon an amount of interference. The shift can be based on the amount of interference in the first demodulated output (for example, exceeding or not exceeding a preset amount of interference). The shift can be also be based on comparing an amount of interference in the first demodulated output to an amount of interference in the second demodulated output and utilizing the demodulated output with the lowest amount of interference. In other embodiments, the shift may also be based on stability or consistency of the measured interference. In some embodiments, similar comparisons and shifting can be made among more than two different types of demodulated outputs. In one embodiment, the amount of interference is a measure of ambient/environmental interference during a time when no transmitter signals are being driven by transmitter circuitry 405 or transmitted with a transmitter electrode or combination electrode. In another embodiment, the amount of interference is a measure of ambient/environmental interference during a time when no transmitter signals are being driven by transmitter circuitry 405 or transmitted with a transmitter electrode or combination electrode within the receiver demodulation and filter band. In another embodiment, the amount of interference is a measure of the change in signal power during a time when it is determined that there is not a user input signal (e.g., there is negligible coupling to any input object). For example, demodulation type selector 435 can direct receiver circuitry 415 to receive a second resulting signal during a time period when no transmitter signal is transmitted with any transmitter electrode by transmitter circuitry 405. Demodulation type selector 435 then directs demodulation circuitry 425 to acquire a third demodulated output by demodulating this second resulting signal in one of the first and second ways. Demodulation type selector 435 determines an amount of interference that exists in this third demodulated output (and may also determine frequencies at which ambient interference exist) and can use this amount in selecting a type of demodulation to use. In other embodiments, the demodulation type selector 435 can further direct demodulation circuitry 425 to acquire the third demodulation output and a fourth demodulation output by demodulating the second resulting signal in both the first and second ways. In further embodiments, the demodulation type selector 435 can further direct demodulation circuitry 425 to acquire any number of demodulation outputs by demodulating the second resulting signal in a plurality of different ways. The demodulator type selector 435 can be configured to select the type of demodulation by comparing the interference in each demodulation output to each other and selecting the type of demodulation having the lowest amount of interference. In other embodiments, the demodulation type selector 435 is configured to compare the amount of interference in each demodulation output to a predetermined amount and select a type of demodulation that is below the predetermined amount. Note, that in various embodiments, transmitter circuitry 405 may also change the modulation of the transmitter electrodes (combination electrodes) to optimize the effectiveness of the demodulator.

In one embodiment, when included, computation circuitry 445 operates to determine a measurement of a change in transcapacitive coupling between a transmitter electrode and a receiver electrode. Computation circuitry then uses this measurement of change in transcapacitive coupling to determine the position of an input object (if any) with respect to sensing region 120. The measurement of change is determined based on the demodulated output that is acquired by demodulation circuitry 425. In one embodiment, the first demodulated output is used when an amount of interference does not exceed a predetermined amount. In one embodiment, the second demodulated output is used when interference does exceed a predetermined amount. The selection of which demodulated output to use, is made, in some embodiments, by demodulation type selector 435 in the manner previously described. In one embodiment one or more filtered or compressed baselines may be used to determine a change in capacitive coupling.

In some embodiments, processing system 110A and the input device 100 of which it is a part may be disposed in or communicatively coupled with an electronic system 150, such as a display device. In one such integrated embodiment, transmitter electrodes are utilized as combination electrodes to support both display updating functions and touch sensing functions (e.g., for a touch screen device that is integrated with the display of the display device). Thus, the transmitter signals driven on these combination electrodes by transmitter circuitry 405 serve the purpose of both display updating and touch sensing.

Example Method of Interference Avoidance for a Capacitive Sensor Device

Figure 5B:
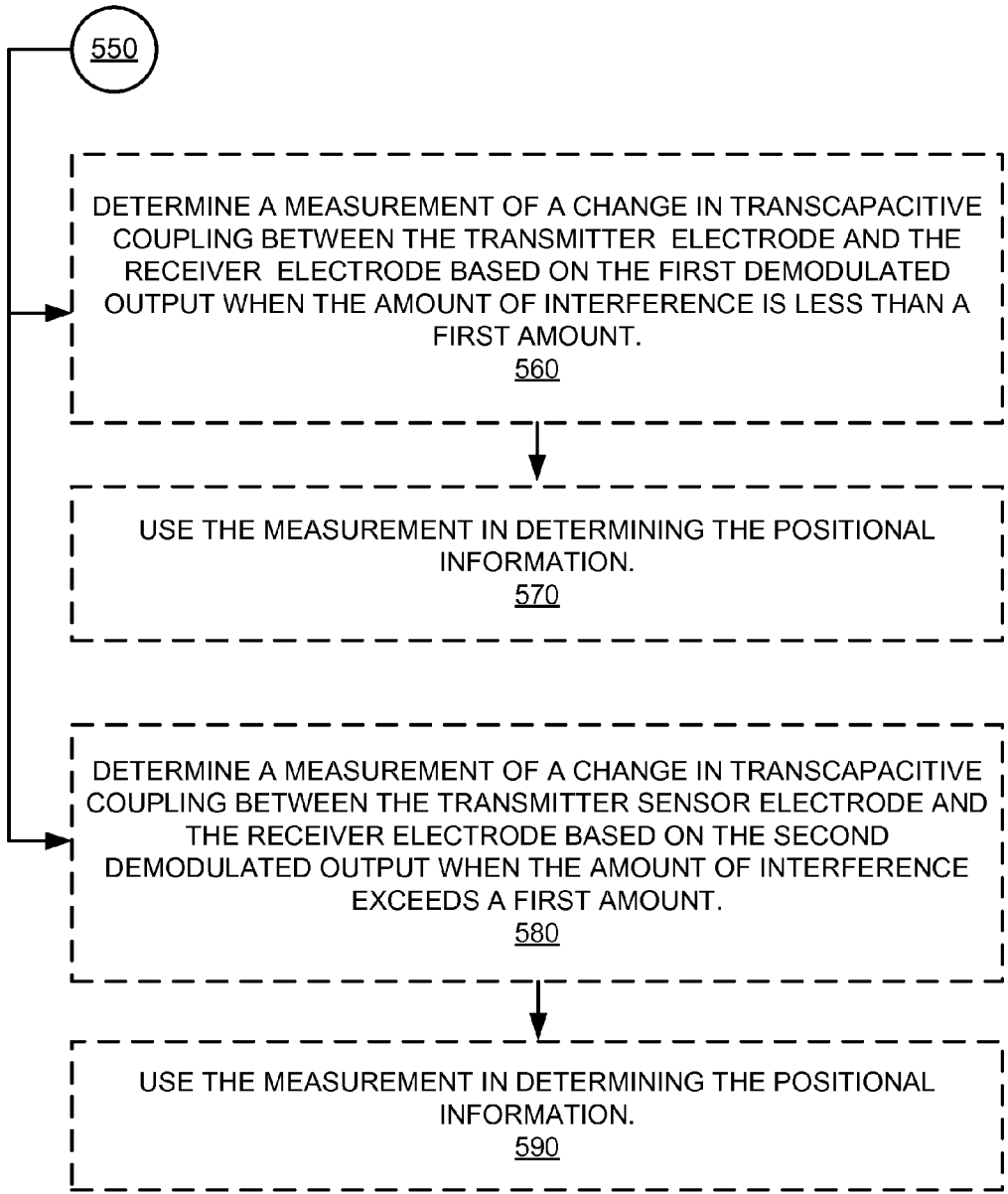

FIGS. 5A and 5B illustrate a flow diagram 500 of an example method of interference avoidance for a capacitive sensor device, according to various embodiments. For purposes of illustration, reference will be made to components of processing system 110A of FIG. 4 in the description of flow diagram 500. In some embodiments, not all of the procedures described in flow diagram 500 are implemented. In some embodiments, other procedures in addition to those described may be implemented. In some embodiments, procedures described in flow diagram 500 may be implemented in a different order than illustrated and/or described.

At 510 of flow diagram 500, in one embodiment, a transmitter signal is transmitted with a transmitter electrode of a capacitive sensor device. In one embodiment, transmitter circuitry 405 drives the transmitter signal. The transmitter signal is a waveform, such as a square wave, trapezoidal wave, or other waveform. In some embodiments, when a capacitive sensor device is utilized in conjunction with and/or integrated with a display of a display device, the transmitter signal is transmitted and timed such that it includes two or more transitions that occur during a non-display update time period associated with updating a row of a display device. In some embodiments, processing system 110 may be configured to transmit with more than one group of combination electrodes at different times or phases (e.g., transmitting with one group of combination electrodes while a second group of combination electrodes are driven with a stationary voltage) during a non-display update time associated with updating a frame of a display (e.g., vertical blanking time). In one such embodiment, the display device (e.g., one or more display rows thereof) at least partially overlaps a sensing region of the capacitive sensor device.

At 520 of flow diagram 500, in one embodiment, a resulting signal is received with a receiver electrode of the capacitive sensor device. As previously described, the resulting signal corresponds to the transmitter signal. In one embodiment, the resulting signal is received from a receive sensor electrode by receiver circuitry 415.

At 530 of flow diagram 500, in one embodiment, a first demodulated output is acquired by demodulating the resulting signal in a first way. In one embodiment, demodulation circuitry 425 acquires this first demodulated output by demodulating the resulting signal in a first way of a plurality of different ways that it is capable of demodulating.

At 540 of flow diagram 500, in one embodiment, a second demodulated output is acquired by demodulating the resulting signal in a second way, where the second way and the first way differ from one another. In one embodiment, demodulation circuitry 425 acquires this second demodulated output by demodulating the resulting signal in a second way of a plurality of different ways that it is capable of demodulating. It is appreciated that the first and second way of demodulation may be different because samples are weighted differently in the second way than the first way; because samples are sampled in a different phase in the second way than in the first way; because a different number of samples is used in the second way than in the first way; and/or because the second way utilizes one or more different time spans between samples than the first way.

At 550 of flow diagram 500, in one embodiment, the method shifts from using the first demodulated output for determining positional information to using the second demodulated output for determining positional information. The shift is based, at least in part, upon an amount of interference. In one embodiment, demodulation type selector 435 determines when and to what type of demodulation to shift. In one embodiment, the amount of interference is based on a measurement of interference in first demodulated output. In one embodiment, the amount of interference is based on a measurement of interference in the second demodulated output. Amounts can be compared to one another or to a predetermined scale. In one embodiment, the amount of interference is a measure of ambient/environmental interference during a time when no transmitter signals are being transmitted by transmitter circuitry 405. For example, receiver circuitry 415 receives a second resulting signal from a receiver electrode during a time period when no in band transmitter signal is transmitted with any transmitter electrode/combination electrode by transmitter circuitry 405. For example, in one embodiment, the demodulation and transmitted transmitter signals may be out of phase (substantially orthogonal) such that the resulting signal is substantially zero. In one embodiment, this may be equivalent to not transmitting a transmitter signal with the transmitter electrodes while receiving with the receiver electrodes. In one embodiment, the effect of a user input signal can be distinguished from interference which may be present independent of the transmitted transmitter signal. In one embodiment, demodulation circuitry 425 acquires a third demodulated output by demodulating this second resulting signal in one of the first and second ways and determining an amount of interference that exists in this third demodulated output. This amount of interference from the third demodulated output is then used as a basis for selecting among the plurality of different types of demodulation (e.g., first type, second type, etc.) to use.

At 560 of flow diagram 500, in one embodiment, the method further includes a procedure of determining a measurement of a change in transcapacitive coupling between the transmitter electrode and the receiver electrode based on the first demodulated output when the amount of interference is less than a first amount. In one embodiment, this comprises demodulation type selector 435 selecting a type of demodulation which will be employed by processing system 110A when the amount of interference is less than a first predetermined amount. Computation circuitry 445 then determines the measurement of a change in transcapacitive coupling (if any).

At 570 of flow diagram 500, in one embodiment, the measurement of change in transcapacitive coupling determined at 560 of flow diagram 500 is then used by computation circuitry 445 in determining positional information of an input object (if any) relative to sensing region 120.

At 580 of flow diagram 500, in one embodiment, the method further includes a procedure of determining a measurement of a change in transcapacitive coupling between the transmitter electrode and the receiver electrode based on the second demodulated output when the amount of interference exceeds a first amount. In one embodiment, this comprises demodulation type selector 435 selecting a type of demodulation which will be employed by processing system 110A when the amount of interference exceeds the first predetermined amount. Computation circuitry 445 then determines the measurement of a change in transcapacitive coupling (if any).

At 590 of flow diagram 500, in one embodiment, the measurement of change in transcapacitive coupling determined at 580 of flow diagram 500 is then used by computation circuitry 445 in determining positional information of an input object (if any) relative to sensing region 120.

Section 2

Shifting Carrier (Transmitter Signal) Frequency to Avoid Interference

FIG. 6 illustrates a display device and timing 600 comprising a display with a plurality of display rows 610 and their respective update times. In one embodiment, the physical row electrodes are used to sequentially update associated pixel from top to bottom of the display. The update of pixels (or pixel color channels) is indicated from left to right. In one embodiment, the common electrodes associated with plurality of display rows 610 at least partially overlap a sensing region of a capacitive sensor device. Also illustrated, according to an embodiment, is non-display update time 650 at the end of each pixel update time 640 for a display pixel row. Non-display update time 650 is associated with updating a display pixel row of the display device. Below display pixel rows 610, non-display update time 620 is also illustrated, according to an embodiment. As illustrated, line update time 630 is a sum of at least a pixel update time 640 and non-display update time 650. Non-display update time 650 may be referred to as horizontal blanking time or non-update time and non-display update time 620 may be referred to vertical blanking time (lines or rows). In one embodiment, a non-display update time associated with different rows may be different. For example, in one embodiment, the non-display update time associated with different rows may be different to synchronize the display device with an external source. For example, the non-display update time between the last row of a previous frame and the first row of a frame may be longer than the non-display update time between the first and second rows of a single frame.

The transmitter signal frequency (carrier signal frequency) of display device 600 may be based on a relation of the display frame refresh rate (frame rate), number of display pixel rows 610, pixel update time 640, non-display update time 650, and the non-display update time 620. Further, even though FIG. 6 shows a non-display update time occurring after the pixel row update time 640 for each display pixel row, in other embodiments the non-display update time may occur at other times and/or multiple non-display update times may occur on each display pixel row. In various embodiments, multiple pixels may be updated during a pixel row update time. For example, a non-display update time may occur after updating each pixel channel (e.g., after updating each red, blue and/or green color channel) of a display pixel row. In various embodiments a non-display update time may vary from display pixel row to display pixel row (e.g., first to second or last to first). In one embodiment, row selection may comprise using transistors on the thin film transistor (TFT) glass selected (as a row) by the Display Driver Integrated Controller (DDIC). The DDIC may be disposed on the TFT glass and electrically coupled to the display pixel rows by Chip on Glass (COG) connections. In one embodiment, a separate flex (connected by anisotropic conductive film (ACF)) may carry signals to a host processing system and to other elements of the processing system.

By varying the line update time 630, by adjusting the non-display update time 650, and/or by adjusting the number of vertical blanking lines, a synchronized transmitter signal frequency can be shifted or modulated for interference avoidance without varying the display frame refresh rate. In such an embodiment, the demodulation frequency or frequencies may be shifted similarly to the transmitter signal frequency while achieving interference avoidance; various synchronization methods may be used to maintain the similarity. Synchronization signals that may indicate horizontal row timing and vertical frame timing may be shared and used for synchronization. Further, when multiple horizontal blanking times per display pixel row are used it is possible to vary the time of each individually. In a display device it is often desirable to maintain the pixel update time 640 and display frame refresh rate to maintain display quality (e.g., to avoid flickering, color shifting, or other visually noticeable issues). Synchronization signaling between or within a processing system for the display device and a processing system for a capacitive sensor device can be used to maintain synchronization of the horizontal refresh rate, control the length of the vertical blanking time, manage requests for changing the transmitter signal frequency, or indications that a transmitter signal frequency may change. In one embodiment, such synchronization is facilitated by utilizing a common processing system to perform capacitive touch sensing and display update in an integrated capacitive sensor device and display device. In another embodiment synchronized signals are shared between the capacitive sensing device and the display device. In one embodiment, the signals may be generated based on the display line or pixel timing of the display. In one embodiment, the signals may be based on the frame timings of the display.

Consider an example where display device 600 has 800 display pixel rows 610 with a pixel update time 640 of 15 μs per display pixel row and a horizontal blanking time of about 5 μs per display pixel row. In such an embodiment the line update time is 20 μs, and corresponds to a Vcom carrier frequency of about 25 KHz (e.g., for a line inversion method with ½ cycle per line). In this example, there are 10 vertical blanking lines, for a total of 810 rows. Therefore, the frame refresh rate is 1/(810*20 μs) which is about 60 Hz. In one embodiment, additional lines may be added or lines may be removed to synchronize the display to the video or image source.

To change the interference susceptibility of the capacitive sensor, the transmitter signal, having a first frequency, can be shifted to a second transmitter signal having a second frequency, where the first and second frequencies differ. To shift from the transmitter signal having a first frequency to the second transmitter signal having a second frequency, the line update time 630, non-display update time 650, and number of non-display update time 620 can be adjusted to maintain a constant or substantially constant frame refresh rate and constant pixel update time 640 for each display pixel row. Following this example, for a 10 percent higher transmitter signal frequency of 27.5 kHz the line update time 630 is approximately 18 µs, and the shorter non-display update time 650 is approximately 3 µs to keep the pixel update time 640 constant at 15 µs and to maintain a constant frame refresh rate of approximately 60 Hz. Therefore, to change the line update time 630, the non-display update time 650 and length (e.g., number of equivalent rows) of non-display update time 620 will change. Based on the current example, for a display device having 800 display rows and 10 vertical blanking lines and a line update time of 20 µs, there are 810 total pixel rows (display rows+vertical blanking lines) to be updated during a frame refresh of the display. For a line update time of 18 µs, 900 total pixel rows with a horizontal blanking time of 3 µs would be required, and since the number of display pixel rows 610 is constant based on the resolution of the display (800 pixel lines in this example) the length of vertical blanking time (e.g., number of equivalent lines) is increased from 10 lines to 100 lines. Therefore, it would be possible to shift the frequency of the transmitter signal and similarly shift the demodulation frequency for interference avoidance, and in this example, provide an approximately 10% line frequency shift without changing the frame refresh rate. In other embodiments, the line update time 630 and the non-display update time 650 and the number of the non-display update time 620 can also be separately varied, also changing the interference susceptibility of the system. In another embodiment, multiple non-display update times may occur in a single display frame with multiple transitions during each non-display update time. In one embodiment, a capacitive image may be measured to two separate vertical blanking times. The first vertical blanking time may be related to a first fraction of the display frame pixel rows and the second vertical blanking time may be related to a second fraction of the display frame pixel rows. The first and second fractions may be interlaced or contiguous. In such embodiments, the capacitive measurement frame rate may be at a rate different than the display frame rate.

In various embodiments, the length of the one or more of the vertical blanking lines may also be varied. In other embodiment, multiple transitions may be received and used to determine a change in transcapacitive coupling between transmitter and receiver electrodes caused by user input. In one embodiment, a signal may be shared between a display device and a capacitive sensing device to indicate the change in the horizontal non-display update time or vertical blanking lines. In one embodiment, the transmitter and demodulation frequencies can be changed without altering a non-display update time. In one embodiment, the amount of time (e.g., duration) that a combination electrode is transmitting (and/or that a receiver electrode is receiving) during a non-display update time is changed (e.g., maintaining a constant number of cycles but varying the frequency of the transmitter). In some embodiments, the spacing (e.g., duration) between measurements may be changed. In various embodiments, multiple horizontal non-display update times (horizontal blanking periods) may be changed. Further, transmitter signals may be transmitted on more than one combination electrode (or sets of combination electrodes) at substantially the same time. The combination electrodes may be spatially separate or adjacent to one another. In one embodiment, when multiple combination electrodes are driven with transmitter signals, at least one transmitter signal comprises transitions during a horizontal blanking period. In one embodiment, transmitter signals that are driven on combination electrodes (or a set of combination electrodes) that are spatially separated from the display pixel row being updated and may have transitions that occur outside of the non-display update time, rather than exclusively during a non-display update time.

Second Example Processing System

Figure 7:
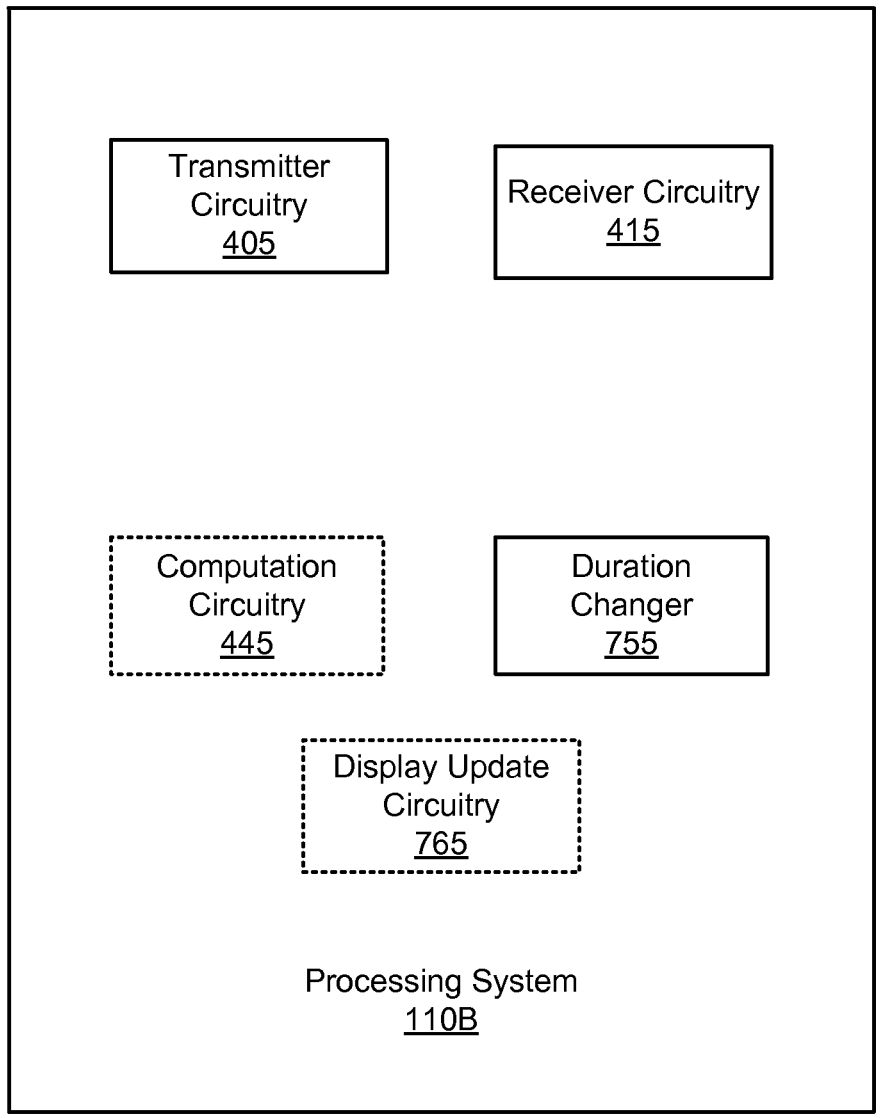
FIG. 7 illustrates a second example processing system which may be utilized with an input device, according to various embodiments.

FIG. 7 illustrates a second example processing system 110B which may be utilized with an input device (e.g., input device 100), according to various embodiments. Processing system 110B may be implemented with one or more ASICs, one or more ICs, one or more controllers, or some combination thereof. In one embodiment, processing system 110B is communicatively coupled with a plurality of transmitter electrodes (or combination electrodes) and a plurality of receiver electrodes of sensing region 120 of an input device 100. In one embodiment of input device 100, processing system 110B includes transmitter circuitry 405, receiver circuitry 415, and duration changer 755. Some embodiments additionally include display update circuitry 765 and/or one or more of the other components illustrated in processing system 110A of FIG. 4 (e.g., computation circuitry 445).

Processing system 110B and the input device 100 of which it is a part are disposed in and/or are communicatively coupled with an electronic system 150, such as a display device (e.g., display device 600). In one such integrated embodiment, combination electrodes are utilized to support both display updating functions and capacitive sensing functions (e.g., for a touch screen device that is integrated with the display of the display device). Thus, the transmitter signals driven on these combination electrodes by transmitter circuitry 405 serve the purpose of both display updating and capacitive sensing. Overlaying and integrating the sensor pattern of FIG. 1B (combination electrodes 160 and receiver electrodes 170) with the display pixel lines 610 of display device 600 (FIG. 6) would be one example of such an embodiment. In other embodiments, the receiver and transmitter electrodes are disposed above the display electrodes (e.g., on the color filter glass, display lens or another substrate of the display or external to the display) and the transmitter electrodes may not be part of the display device and are not the combination electrodes, but the transmitter electrodes may still be synchronized with the display.

Transmitter circuitry 405 may operate to drive a transmitter signal on one or more transmitter or combination electrodes that are disposed in a sensing region/display. In a given time interval, transmitter circuitry 405 may drive a transmitter signal (waveform) on one or more of a plurality of combination electrodes. In one embodiment, the transmitter signal has a first frequency. In one embodiment, the time interval for which the same set of (or group of) combination electrodes are driven may be one half cycle (single transition) and one non-display update time or it may be for multiple (half) cycles and multiple non-display update times. In one embodiment, the spatial selection of selected combination electrodes may scan in an overlapping manner, where a segment of a segmented Vcom electrode of the combination electrode set may be driven in two consecutive non-display times. In another embodiment the spatial selection of selected combination electrodes may scan in a non-overlapping manner, where a segment of a segmented Vcom electrode of the combination electrode may be driven during a first non-display update time and not during a consecutive non-display update time. In one embodiment, a set of forty combination electrodes (e.g., a block of combination electrodes) may be driven through two duty cycles (e.g., in twenty row times) and in a subsequent twenty cycles a different non-overlapping set of combination electrodes (e.g., a different block) may be driven. Different numbers of combination electrodes may form each set and combination electrodes and different combination electrodes within a set may be driven at different polarities. In one embodiment, different numbers of combination electrodes may form each set and combination electrodes and different combination electrodes within a set may be driven may be driven with different voltages. In such embodiments, the signals from the set are similarly modulated and demodulated as a set.

In another embodiment, a set of twenty combination electrodes may be driven through one half of a cycle and then a new overlapping set of combination electrodes is driven. The second set of combination electrodes is incremented by one combination electrode, where all but one combination electrode overlaps. In other embodiments, the sets may be incremented by other amounts so that different numbers of combination electrodes overlap.

In one embodiment, the combination electrodes may be directly coupled to the processing system 110 or DDIC or connected through selection and arbitration transistors. The electrodes may be coupled at different or multiple points (e.g., at a left end, right end or on both ends) to the transmitter circuitry of the processing system 110. The transmitter signal may be a square wave, trapezoidal wave, or some other waveform. Waveforms 910, 920, and 930 of FIG. 9 illustrate some examples of transmitter signals which may be transmitted by transmitter circuitry 405. It should be noted, and will be further explained below, that waveforms 910, 920, and 930 illustrate that multiple transitions (e.g., two or more) can be made in the waveform of the transmitted transmitter signal and timed such that the transitions occur during a non-display update time period (e.g., horizontal blanking period or vertical blanking period). During a blanking period, the transitions will have a minimal effect upon display updating, but can provide sufficient transitions for sampling (e.g., demodulating) for touch sensing.

Receiver circuitry 415 operates to receive resulting signals, via receiver electrodes that correspond to the transmitted transmitter signals (e.g., transitions). The received resulting signals correspond to and may include some version of the transmitter signal(s) transmitted via the transmitter electrodes. These transmitted transmitter signals however, may be altered or changed in the resulting signal due to stray capacitance, interference (noise), and/or circuit imperfections among other factors, and thus may differ slightly or significantly from their transmitted versions. Demodulation of resulting signals corresponding to different sets of driven transmitter electrodes (combination electrodes) may comprise different timings (e.g., delayed or lengthened integration and sampling) or alternatively they may all be substantially similar. Resulting signals may be received on one or a plurality of receiver electrodes during a time interval. In one embodiment, in a low power mode, fewer receiver electrodes may be used. FIGS. 3A-3D illustrate sampling of resulting signals which are received by receiver circuitry 415. In one embodiment, the resulting signals may also be altered due to the effect of user input on the coupling capacitance.

Duration changer 755 may operate to change a duration of at least one non-display update time period of a display device. This can be a change in one or more of the horizontal blanking time or the number of vertical blanking lines (or duration of the vertical blanking time). In one embodiment, the change in duration is initiated by duration changer 755 based on an amount of interference. For example, duration changer 755 can measure and compare amounts of interference in any of the manners described in conjunction with demodulation type selector 435, including measuring ambient interference. The change in duration causes a shift from transmitting the first transmitter signal with the combination electrode to transmitting a second transmitter signal the combination electrode. The second transmitter signal has a second frequency that is different from the first frequency of the first transmitter signal. The change in duration does not substantially change a refresh rate of the display device. By "not substantially," what is meant is that the refresh rate is maintained within a window plus or minus a small percentage of the refresh rate, which does not visibly alter viewing to a human viewer of the display device, and minimal effect on any image/video synchronization. In one embodiment, duration changer 755 may operate to change the length of time that the resulting signals are demodulated or change the length of time between demodulated sets of resulting signals (e.g., resulting signals corresponding to combination electrodes driven during a vertical blanking time). In various embodiments, the resulting signals may be demodulated for different durations and/or for different frequencies to maintain a constant number of demodulation cycles.

In one embodiment, duration changer 755 changes the duration of the at least one non-display update time period by increasing duration of a non-display update time period (e.g., increasing the length of a horizontal blanking time or increasing the number of vertical blanking lines) associated with updating a pixel display row (or frame) of the display device. In one embodiment, duration changer 755 changes the duration of the at least one non-display update time period by decreasing duration of a non-display update time period (e.g., decreasing the length of a horizontal blanking time or decreasing the number of vertical blanking lines) associated with updating a pixel display row of the display device. In one embodiment, by monitored LCD signals (e.g., Tear Enable (TE) horizontal row timing signals or vertical frame timing signals) may be used to detect, predict and change the horizontal blanking times and vertical blanking times used for transmitting.

Display update circuitry 765 operates to perform display updating functions by using the first transmitter signal and the second transmitter signal as display update signals for updating the display device. For example, the first and second transmitter signals can be transmitted with a combination electrode that is being utilized to update the display device and simultaneously being used as a transmitter electrode of a capacitive sensor device.

Example Method of Avoiding Interference in an Integrated Capacitive Sensor and Display Device FIG. 8 illustrates a flow diagram 800 of an example method of avoiding interference in an integrated capacitive sensor device and display device, according to various embodiments. For purposes of illustration, reference will be made to components of processing system 110B of FIG. 7 in the description of flow diagram 800. In some embodiments, not all of the procedures described in flow diagram 800 are implemented. In some embodiments, other procedures in addition to those described may be implemented. In some embodiments, procedures described in flow diagram 800 may be implemented in a different order than illustrated and/or described.

At 810 of flow diagram 800, in one embodiment, a first transmitter signal is transmitted with a combination electrode of an integrated capacitive sensor device and display device.

The combination electrode is configured for both capacitive sensing and display updating. The first transmitter signal has a first frequency. In one embodiment, transmitter circuitry 405 drives the first transmitter signal that is transmitted with the combination electrode.

At 820 of flow diagram 800, in one embodiment, a shift is made from transmitting the first transmitter signal with the combination electrode to transmitting a second transmitter signal with the combination electrode. In one embodiment, transmitter circuitry 405 drives the first transmitter signal. In one embodiment, the shift is carried out by duration changer 755 in a manner previously described. The shift involves changing a duration of at least one non-display update time period of the display device (e.g., altering one or more horizontal blanking times or varying the number or duration of vertical blanking lines). In one embodiment, the shift comprises changing the length time that a set of combination electrodes are driven to measure a change in capacitance or changing the time between driven sets of combination electrodes. For example, duration changer 755 can increase or decrease duration of a non-display update time period (e.g., one or more horizontal blanking times or vertical blanking lines) associated with updating a row of the display device. The second transmitter signal has a second frequency which is different from the first frequency. In some embodiments, the repeat period of the transmitter modulation or the cycle time of the modulation is different or the pulse width is different. The shifting occurs based, at least in part, upon an amount of interference and does not substantially change the refresh rate of the display device. That is, in some embodiments, the frame refresh rate will not change at all, or else may change by some small amount which is not noticeably perceptible to a human viewer of the display device. It is possible to affect a greater change than this to the refresh rate between the first and the second transmitter signal, however, a large change should be weighed against any possible negative visual impact it may cause for a user/viewer of a display device or with video or image synchronization with the device.

The first and second transmitter signals are waveforms, such as a square waves, trapezoidal waves, or other waveforms. In some embodiments, either or both of the first and second transmitter signals is/are transmitted and timed such that the signal(s) include(s) two or more transitions that occur during a non-display update time period associated with updating a row of a display device in which the transmitter signals are being used.

At 830, in one embodiment, the method of flow diagram 800 further includes a procedure of using the first transmitter signal for some part of the signal period to update the display device. In one embodiment, for example, display update circuitry 765 operates to perform display updating functions by using both the first transmitter signal and the second transmitter signal as display update signals for updating the display device. For example, the first and second transmitter signals can be transmitted with a combination electrode that is being utilized to update a display device and simultaneously being used as a transmitter electrode of a capacitive sensor device (e.g., for a line inversion display). In one embodiment, the first and second transmitter signals may be utilized to update a display device for some portion of the display frame and be utilized to transmit during a non-display update time (e.g., for a DC Vcom dot-inversion display).

At 840, in one embodiment, the method of flow diagram 800 further includes a procedure of receiving a resulting signal with a receiver electrode, where the resulting signal corresponds to the first transmitter signal. In one embodiment, for example, the resulting signal can be received by receiver electrode and communicatively coupled with circuitry 415. In other embodiments, a receiver electrode may also receive resulting signals when no transmitter signal is transmitted to measure interference.

At 850, in one embodiment, a first measurement is determined of a change in a transcapacitive coupling between the combination electrode and the receiver electrode. This first measurement is determined based on the resulting signal that is received in procedure 840. For example, computation circuitry 445 can determine the measurement of a change in transcapacitive coupling (if any).

At 860, in one embodiment, positional information is determined. This positional information is determined based on the first measurement of procedure 860. For example, computation circuitry 445 can determine positional information of an input object (if any) relative to sensing region 120.

Section 3

Sensing During Display Non-Display Update Time to Avoid Interference

In some embodiments, the transmitter signal may be transitioned more than once before pixel row updates during the non-display update time (e.g., horizontal blanking period or vertical blanking period) to improve the signal to noise ratio and interference susceptibility. In other embodiments, a non-display update time may occur between row updates of a display line and/or at other times. In various embodiments, display frames may be updated progressively or interlaced (e.g., during a first display frame a first half or fraction of the display is updated and during a second display frame a second half or fraction of the display is updated and where the two halves or fractions are interlaced). In one embodiment, a first non-display update time is associated with updating a first pixel row of a display frame and a second non-display update time is associated with updating a second pixel row of a display frame. In one embodiment, a first non-display update time is associated with updating a first interlaced fraction of a display frame and a second non-display update time is associated with a second interlaced fraction of the display frame. In one embodiment, the same non-display update times are repeated at the frame rate (or a fraction of the frame rate) and any variations in the non-display update times are made at the smallest spatial separation to minimize visible effects.

FIG. 9 illustrates three transmitter signals 910, 920, and 930 with transitions during non-display update time, according to various embodiments. In FIG. 9, transmitter signal 910 has two transitions, transmitter signal 920 has three transitions, and transmitter signal 930 has four transitions. Each of these transmitter signals 910, 920, 930 has the transitions timed such that they occur during a non-display update time associated with a display row (e.g., prior line update time or post line update time as shown in FIG. 9). In various embodiments, the transmitter signals 910, 920, 930 may have an average output equal to half of the peak amplitude (e.g., ((Vcom+)+Vcom−)/2). Maintaining an average voltage near ((Vcom+)+Vcom−)/2) can contribute positively to the display quality. In one embodiment, the average Vcom voltage is a DC Vcom voltage.

FIG. 9 shows that the double transition transmitter signal 910, the triple transition transmitter signal 920, and the quadruple transition transmitter signal 930 can provide two or more signal sample pairs. In other embodiments, other number of transitions may also be used. In some embodiments, more than four transitions may be used and more than one set of electrodes may be scanned. In one embodiment, more than 20 transitions may be used. Transmitter signals (e.g., 920) with odd numbers of transitions would (typically) be used when a display is scanned using line inversion (the Vcom voltage alternates between two voltages when scanning pixel display rows). Transmitter signals (e.g., 910, 930) with even numbers of transitions such as 2, 4, 6 or more transitions would (typically) be used when a display is scanned using dot inversion (the Vcom voltage returns to a constant voltage when scanning pixel display rows). Both the positive and negative samples may be demodulated even when there is only a single transition, or fewer samples can be used (e.g., only two samples of opposite or the same polarity) even when more transitions occur (e.g., three or four) and not all transition amplitudes need to be the same. Double sampling allows for non-overlapping susceptibility curves as described above. In another embodiment, a change in duration may change the duration of the transitions during more than one non-display update in a display frame. In such an embodiment, the number of demodulated transitions can be maintained constant at a different sensing frequency.

In one embodiment, the maximum number of effective transitions corresponds to the settling time of the combination electrodes. Further, in other embodiment, the maximum amount of time for updating the pixels also corresponds to the settling time of the combination electrode. In other embodiments, as the settling times for the combination electrodes are improved (e.g., shortened), the number of transitions and/or amount of non-display update time may be increased. In one embodiment, the settling time for the combination electrodes may be improved by coupling each combination electrode to one or more low impedance drivers at one or more locations along the length of the combination electrode. Further, in other embodiments, the settling time of the receiver electrodes may be improved by coupling processing system 110 at more than one location along the length of each receiver electrode, increasing the thickness and/or width of each receiver electrode, using additional low resistance materials or using any other means to reduce the resistance or capacitance of each receiver electrode.

Third Example Processing System

Figure 10:
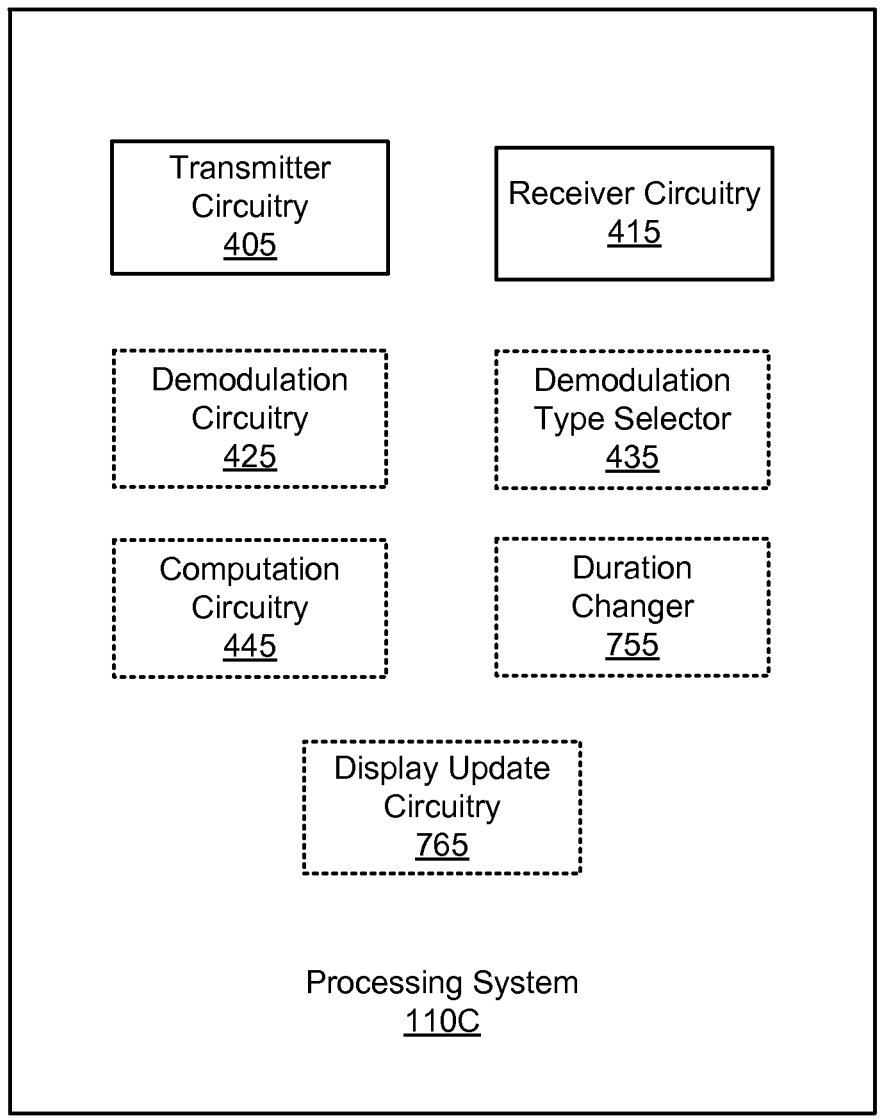
FIG. 10 illustrates a third example processing system which may be utilized with an input device, according to various embodiments.

FIG. 10 illustrates a third example processing system 110C which may be utilized with an input device (e.g., input device 100), according to various embodiments. Processing system 110C may be implemented with one or more ASICs, one or more ICs, one or more controllers, or some combination thereof. In one embodiment, processing system 110C is communicatively coupled with a plurality of combination electrodes and a plurality of receiver electrodes of sensing region 120 of an input device 100. In one embodiment of input device 100, processing system 110C includes transmitter circuitry 405 and receiver circuitry 415. Some embodiments additionally include one or more of demodulation circuitry 425, demodulation type selector 435, computation circuitry 445, duration changer 755, and/or display update circuitry 765.

Processing system 110C and the input device 100 of which it is a part are disposed in and/or are communicatively coupled with an electronic system 150, such as a display device (e.g., display device 600). In one such integrated embodiment, combination electrodes are utilized to support both display updating functions and capacitive sensing functions (e.g., for a capacitive sensing device that is integrated with the display of the display device). Thus, the transmitter signals driven on these combination electrodes by transmitter circuitry 405 serve the purpose of both display updating and touch sensing. Overlaying and integrating the sensor pattern of FIG. 1B (combination electrodes 160 and receiver electrodes 170) with the display pixel lines of a display device would be one example of such an embodiment.

Transmitter circuitry 405 operates to drive a transmitter signal that is transmitted with a combination electrode of an integrated capacitive sensor device and display device. The transmitter signal is transmitted with a low impedance transmitter during both a display update time period and also during a non-display update time period that is associated with row update of the display device. In one embodiment, for example, transmitter circuitry 405 drives a transmitter signal, such as transmitter signal 920 of FIG. 9, where the transmitter signal transitions at least two times during the non-display update time period associated with row update of the display device (e.g., during the horizontal blanking time after a display row or during vertical blanking time after the last display row updated in a frame). In one embodiment, transmitter circuitry 405 is configured to simultaneously transmit on a plurality of combination electrodes (e.g., a plurality of pixel rows).

Receiver circuitry 415 operates to receive a resulting signal with a receiver electrode during the non-display update time period (e.g., during the horizontal blanking period when the transitions are taking place). The resulting signal corresponds to the transmitter signal, as has been previously described, but may include interference (noise), or other inputs in addition to some or all content of the transmitted transmitter signal. In one embodiment, the transmitted transmitter signal may be associated with more than one display row update. In one embodiment, a sequence of twenty row updates occurs while the same set of twenty combination electrodes are driven with a similar modulation.

In one embodiment, processing system 110C determines a first measurement of a transcapacitive coupling between the combination electrode (or combination electrode set) and the receiver electrode corresponds to the resulting signal and uses this first measurement of transcapacitive coupling in determining positional information of an input object (if any) relative to sensing region 120. In one embodiment, these functions are performed by computation circuitry 445, if included in processing system 110C.

In one embodiment, processing system 110C transmits a display update signal for the display device portion of the integrated capacitive sensor and display device. The display update signal is transmitted with pixel update electrodes coupled to the combination electrode. In one embodiment, this function is carried out by display update circuitry 765, if included in processing system 110C. In one embodiment, a synchronization pulse is communicated between a discrete capacitive sensing device and a discrete display device. In one embodiment, the synchronized signal is based on the phase of the display frame. In various embodiments, the synchronized signal is based on a display pixel row being updated, frame periods or multiples of the frame periods. In one embodiment, the clock frequency may be shared between the capacitive sensing device and a display device. The clock frequency may include a pixel clock or a divided pixel clock.

In one embodiment, processing system 110C includes demodulation circuitry 425 which, as previously described in conjunction with FIG. 4 and processing system 110A, can: acquire a first demodulated output by demodulating the resulting signal in a first way; and acquire a second demodulated output by demodulating the resulting signal in a second way that is different from the first way of demodulating the resulting signal.

In one embodiment, processing system 110C includes demodulation type selector 435 which, as previously described in conjunction with FIG. 4 and processing system 110A, can shift the demodulation circuitry from using the first demodulated output for determining positional information to using the second demodulated output for determining positional information. The shift can be based, at least in part, upon an amount of interference that is detected by processing system 110C in one or more demodulated outputs.

In one embodiment, processing system 110C includes duration changer 755 which, as previously described in conjunction with FIG. 7 and processing system 110B, can: change a duration of at least one non-display update time period of a display device. This can be a change in one or more of the horizontal blanking time or the period of vertical blanking lines. In one embodiment, the change in duration is initiated by duration changer 755 based on an amount of interference. In another embodiment, the change in duration is initiated by a synchronization signal (e.g., between a capacitive sensing processing system and a display driver). For example, duration changer 755 can measure and compare amounts of interference in any of the manners described in conjunction with demodulation type selector 435, including measurements of ambient interference. The change in duration causes a shift from transmitting the first transmitter signal with the combination electrode to transmitting a second transmitter signal with the combination electrode. The second transmitter signal has a second frequency that is different from the first frequency of the first transmitter signal. The change in duration does not substantially change a refresh rate of the display device. By "not substantially," what is meant is that the refresh rate is maintained within a window of plus or minus a one Hertz in one embodiment. The window may be smaller, such as plus or minus 0.5 Hertz, or larger such as plus or minus 3 Hertz. In various embodiments, the display frame refresh rate may be controlled and synchronized with the display image or video source. In one such embodiment, this may change the duration of different non-display update times within a frame on a frame by frame basis.

Figure 11B:
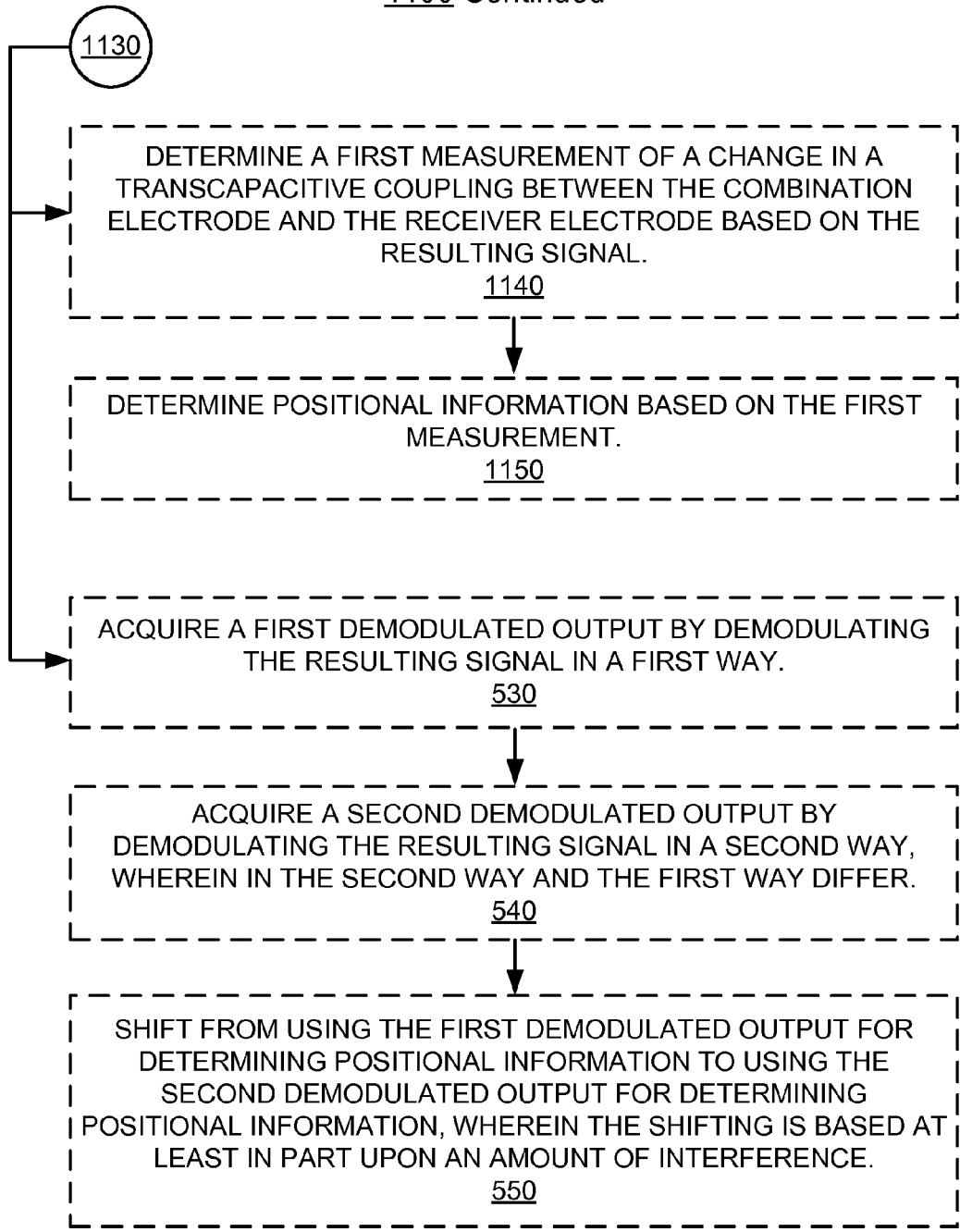
Figure 11C:
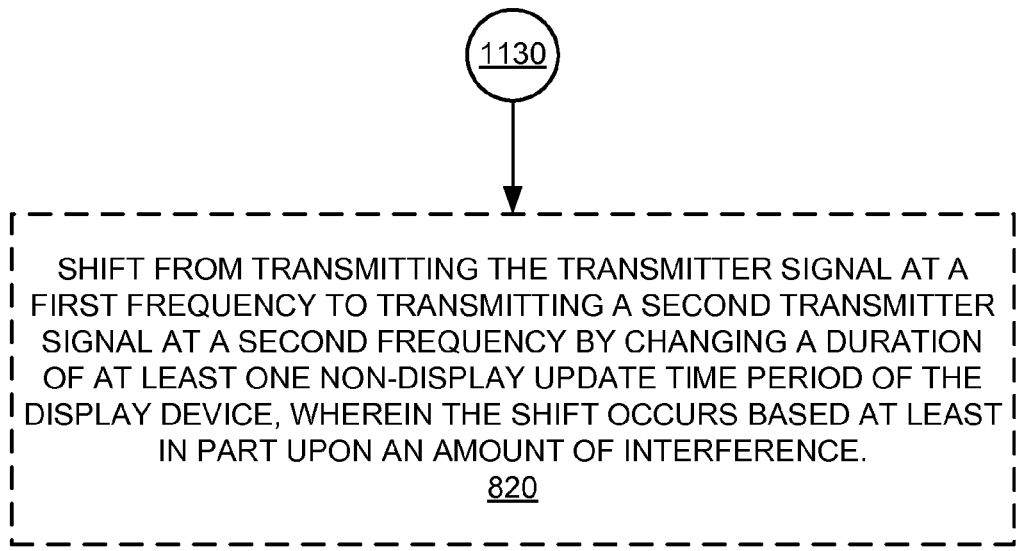

Example Method of Sensing Using an Integrated Capacitive Sensor Device and Display Device FIGS. 11A-11C illustrate a flow diagram 1100 of an example method of capacitive sensing using an integrated capacitive sensor device and display device, according to various embodiments. For purposes of illustration, reference will be made to components of processing system 110C of FIG. 10 in the description of flow diagram 1100. In some embodiments, not all of the procedures described in flow diagram 1100 are implemented. In some embodiments, other procedures in addition to those described may be implemented. In some embodiments, procedures described in flow diagram 1100 may be implemented in a different order than illustrated and/or described.

At 1110 of flow diagram 1100, in one embodiment, a first transmitter signal is transmitted with a combination electrode of an integrated capacitive sensor device and display device. The combination electrode is configured for both capacitive sensing and display updating. The first transmitter signal has a first frequency and transitions at least twice to at least two different signal voltages during a non-display update time period associated with row update of the display device (see e.g., transmitter signal 910, 920, and 930 of FIG. 9). In one embodiment, transmitter circuitry 405 drives the first transmitter signal which is transmitted with the combination electrode. The first transmitter signal may act as a display update signal for updating a display portion of the integrated capacitive sensor device and display device for a portion of the frame times. In one embodiment, transmitter circuitry 405 drives a second transmitted transmitter signal that is associated with a second row during a non-display update time.

At 1120 of flow diagram 1100, in one embodiment, the pixels in a display of the display device are updated during an update time period. In one embodiment, display update circuitry 765 performs this updating while a transmitter signal is being transmitted during pixel update time (see e.g., pixel update time 640 of FIG. 6).

At 1130 of flow diagram 1100, in one embodiment, a resulting signal is received with a receiver electrode of the integrated capacitive sensor device and display device during the non-display update time period. As described previously, the resulting signal corresponds to the first transmitter signal. In one embodiment, the resulting signal is received by receiver circuitry 415 in any of the manners previously described herein.

At 1140, in one embodiment, the method of flow diagram 1100 further includes a procedure of determining a first measurement of a change in a transcapacitive coupling between the combination electrode (or set of combination electrodes) and the receiver electrode based on the resulting signal. In one embodiment, computation circuitry 455 determines this first measurement of a change in transcapacitive coupling.

At 1150 of flow diagram 1100, in one embodiment, the method determines positional information (if any) of an input object relative to a sensing region based on the first measurement of change in a transcapacitive coupling that was determined at 1140. In one embodiment, this positional information determination function is also carried out by computation circuitry 455.

At 530, in one embodiment, the method of flow diagram 1100 further includes a procedure of acquiring a first demodulated output by demodulating the resulting signal in a first way. In one embodiment, demodulation circuitry 425 acquires this first demodulated output by demodulating the resulting signal in a first way of a plurality of different ways that it is capable of demodulating.

At 540 of flow diagram 1100, in one embodiment, a second demodulated output is acquired by demodulating the resulting signal in a second way, where the second way and the first way differ from one another. In one embodiment, demodulation circuitry 425 acquires this second demodulated output by demodulating the resulting signal in a second way of a plurality of different ways that it is capable of demodulating. It is appreciated that the first and second way of demodulation may be different because samples are weighted differently in the second way than the first way; because samples are sampled in a different phase in the second way than in the first way; because a different number of samples is used in the second way than in the first way; and/or because the second way utilizes one or more different time spans between samples than the first way.

At 550 of flow diagram 1100, in one embodiment, the method shifts from using the first demodulated output for determining positional information to using the second demodulated output for determining positional information. The shift is based, at least in part, upon an amount of interference. In one embodiment, demodulation type selector 435 determines when and to what type of demodulation to shift. In one embodiment, the amount of interference is based on a measurement of interference in first demodulated output. In one embodiment, the amount of interference is based on a measurement of interference in the second demodulated output. Amounts can be compared to one another or to a predetermined scale. In one embodiment, the amount of interference is a measure of ambient/environmental (non-sensor) interference during a time when no transmitter signals are being transmitted by transmitter circuitry 405. For example, receiver circuitry 415 receives a second resulting signal from a receiver electrode during a time period when no transmitter signal is transmitted with any combination electrode by transmitter circuitry 405. In one embodiment, demodulation circuitry 425 acquires a third demodulated output by demodulating this second resulting signal in one of the first and second ways and determining an amount of interference that exists in this third demodulated output. This amount of interference from the third demodulated output is then used as a basis for selecting among the plurality of different types of demodulation (e.g., first type, second type, etc.) to use.

At 820, in one embodiment, the method of flow diagram 1100 further includes the procedure of shifting from transmitting the first transmitter signal with the combination electrode to transmitting a second transmitter signal with the combination electrode. In one embodiment, transmitter circuitry 405 drives the first transmitter signal. In one embodiment, the shift is carried out by duration changer 755 in the manner previously described. The shift involves changing a duration of at least one non-display update time period of the display device (e.g., altering one or more horizontal blanking times or varying the number of vertical blanking lines) or one transmitter duration during a non-display update time (e.g., the time transmitting on a combination electrode or the time between transmissions). For example, duration changer 755 can increase or decrease duration of a non-display update time period (e.g., one or more horizontal blanking times) associated with updating a row of the display device. The second transmitter signal has a second frequency which is different from the first frequency. The shifting occurs based, at least in part, upon an amount of interference and does not substantially change the refresh rate of the display device. That is, in some embodiments, the refresh rate will not change at all, or else may change by some small percentage that is not noticeably perceptible to a human viewer of the display device. In one example, the refresh rate may change by some amount that is less than 1 Hz. It is possible to affect a greater change than this to the refresh rate with the second transmitter signal, however, such a change should be weighed against any negative visual impact it may cause for a user/viewer of a display device. In another embodiment, the duration of transmitting a transmitter signal is changed on a first combination electrode. In a further embodiment, the duration of transmitting a transmitter signal in a second combination electrode is changed. In yet another embodiment, the first and second combination electrodes are modulated simultaneously.

The first and second transmitter signals are waveforms, such as a square waves, trapezoidal waves, or other waveforms. In some embodiments, either or both of the first and second transmitter signals is/are transmitted and timed such that the signal(s) include(s) two or more transitions that occur during a non-display update time period associated with updating a first portion of a display device (e.g., a first pixel row or set of rows) in which the transmitter signals are being used. In some embodiments, the first and second transmitter signals are associated with updating a second portion of a display device (e.g., a second pixel row or set of rows) in which the transmitter signals are being used.

In one embodiment, the method of flow diagram 1100 further includes using the first transmitter signal to update the display device. In one embodiment, for example, display update circuitry 765 operates to perform display updating functions by using the first transmitter signal and the second electrical as display update signals for updating the display device. For example, the first and second transmitter signals can be transmitted with a combination electrode that is being utilized to update a display device and simultaneously being used as a transmitter electrode of a capacitive sensor device.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A method of capacitive sensing using an integrated capacitive sensor device and display device comprising a plurality of combination electrodes, said method comprising:
   driving a first combination electrode of said plurality of combination electrodes for capacitive sensing during a first non-display update time period of a first frame;
   driving a second combination electrode of said plurality of combination electrodes for capacitive sensing during a second non-display update time period of said first frame; and
   driving a third combination electrode of said plurality of combination electrodes for capacitive sensing during a third non-display update time period of said first frame, said plurality of combination electrodes configured for both capacitive sensing and display updating, wherein said first non-display update time period occurs before a first display row update time of said first frame, said second non-display update time period occurs between said first display row update time and a second display row update time of said first frame, and said third non-display update time period occurs after said second display row update time, wherein said plurality of combination electrodes operate as a common voltage electrode during display update of said integrated capacitive sensor device and display device,
   wherein driving said first combination electrode, said second combination electrode, and said third combination electrode for capacitive sensing comprises driving said first combination electrode, said second combination electrode, and said third combination electrode, respectively, with a signal that transitions at least twice during each respective non-display update time period of said display device.

2. The method as recited in claim 1, wherein driving said first combination electrode, said second combination electrode, and said third combination, respectively, electrode for capacitive sensing comprises driving said first combination electrode, said second combination electrode and said third combination electrode for absolute capacitive sensing.

3. The method as recited in claim 1, wherein driving said first combination electrode, said second combination electrode, and said third combination electrode for capacitive sensing, respectively, comprises driving said first combination electrode, said second combination electrode and said third combination electrode with a transmitter signal and wherein the method further comprises:
   receiving resulting signals with a plurality of receiver electrodes.

4. The method as recited in claim 1 further comprising:
   updating a display of said display device during an update time period by updating a first display row during said first display row update time and a second display row during said second display row update time.

5. The method as recited in claim 1 wherein said first non-display update time period is longer than a fourth non-display update time period of said first frame.

6. The method as recited in claim 1, wherein said signal has a first frequency, said method further comprising:
shifting from driving said signal having said first frequency to driving a second signal having a second frequency, said shifting based at least in part upon an amount of interference.

7. The method as recited in claim 1 further comprising changing a duration of at least one non-display update time period of said display device.

8. The method as recited in claim 7, wherein said changing a duration of at least one non-display update time period comprises at least one of:
increasing a duration of said first non-display update time period associated with row update of said display device; and
decreasing said duration of said first non-display update time period associated with row update of said display device.

9. A processing system configured to:
drive a first combination electrode of a plurality of combination electrodes for capacitive sensing during a first non-display update time period of a first frame;
drive a second combination electrode of said plurality of combination electrodes for capacitive sensing during a second non-display update time period of said first frame; and
drive a third combination electrode of said plurality of combination electrodes for capacitive sensing during a third non-display update time period of said first frame, said plurality of combination electrodes configured for both capacitive sensing and display updating, wherein said first non-display update time period occurs before a first display row update time of said first frame, said second non-display update time period occurs between said first display row update time and a second display row update time of said first frame, and said third non-display update time period occurs after said second display row update time, wherein said plurality of combination electrodes operate as a common voltage electrode during display update of an integrated capacitive sensor device and display device,
wherein driving said first combination electrode, said second combination electrode, and said third combination electrode for capacitive sensing comprises driving said first combination electrode, said second combination electrode, and said third combination electrode, respectively, with a signal that transitions at least twice during each respective non-display update time period of said integrated capacitive sensor device and display device.

10. The processing system of claim 9, wherein driving said first combination electrode, said second combination electrode, and said third combination electrode for capacitive sensing comprises driving said first combination electrode, said second combination electrode, and said third combination electrode, respectively, with a transmitter signal and wherein said processing system comprises receiver circuitry configured to be coupled to a plurality of receiver electrodes and configured to receive resulting signals when said first, second, and third combination electrodes are driven with said transmitter signal.

11. The processing system of claim 9 wherein driving said first combination electrode, said second combination electrode, and said third combination electrode for capacitive sensing comprises driving said first combination electrode, said second combination electrode and said third combination electrode for absolute capacitive sensing.

12. The processing system of claim 9 comprising display update circuitry configured to update a display of said integrated capacitive sensor device and display device.

13. The processing system of claim 9, wherein said processing system is further configured to update a display of said integrated capacitive sensor device and display device during an update time period by updating a first display row during said first display row update time and a second display row during said second display row update time.

14. The processing system of claim 9 wherein said first non-display update time period is longer than a fourth non-display update time period associated with a fourth row update time of said first frame.

15. The processing system of claim 9 wherein said signal transitions more than twice during each respective non-display update time period of said display device.

16. The processing system of claim 9, wherein said signal has a first frequency, and wherein said processing system is further configured to:
shift from driving said signal having said first frequency to driving a second signal having a second frequency, said shifting based at least in part upon an amount of interference.

17. The processing system of claim 9 further comprising changing a duration of at least one non-display update time period of said display device.

18. The processing system of claim 17, wherein said changing a duration of at least one non-display update time period comprises at least one of:
increasing a duration of said first non-display update time period associated with row update of said display device; and
decreasing said duration of said first non-display update time period associated with row update of said display device.

19. A touch screen device comprising:
a display device, said display device comprising a plurality of combination electrodes configured for both display updating and touch sensing, wherein said plurality of combination electrodes operate as a common voltage electrode during display update of said display device; and
a processing system communicatively coupled with said display device, said processing system configured to:
drive a first combination electrode of said plurality of combination electrodes for capacitive sensing during a first non-display update time period of a first frame;
drive a second combination electrode of said plurality of combination electrodes for capacitive sensing during a second non-display update time period of said first frame; and
drive a third combination electrode of said plurality of combination electrodes for capacitive sensing during a third non-display update time period of said first frame,
wherein driving said first combination electrode, said second combination electrode, and said third combination electrode for capacitive sensing comprises driving said first combination electrode, said second combination electrode, and said third combination electrode, respectively, with a signal that transitions at least twice during each respective non-display update time period of said display device, and wherein said first non-display update time period occurs before a first display row update time of said first frame, said second non-display update time period occurs between said first display row update time and a second display row update time of said first frame, and said third non-display update time period occurs after said second display row update time.

* * * * *